United States Patent
Satish et al.

(10) Patent No.: US 7,917,855 B1
(45) Date of Patent: Mar. 29, 2011

(54) METHOD AND APPARATUS FOR CONFIGURING A USER INTERFACE

(75) Inventors: Vekeepuram R. Satish, Fremont, CA (US); Manish Manhar Parekh, Maharashtra (IN); Shailendra Itnal, Santa Clara, CA (US); Darshana Ashok Daga, Maharashtra (IN); Ronald S. Karr, Palo Alto, CA (US); Amol Narayan Godbole, Maharashtra (IN)

(73) Assignee: Symantec Operating Corporation, Mountain View, CA (US)

(*) Notice: Subject to any disclaimer, the term of this patent is extended or adjusted under 35 U.S.C. 154(b) by 487 days.

(21) Appl. No.: 10/112,895

(22) Filed: Apr. 1, 2002

(51) Int. Cl.
G06F 15/177 (2006.01)
G06F 17/30 (2006.01)
G06F 9/44 (2006.01)

(52) U.S. Cl. ......... 715/744; 707/823; 715/762; 719/328

(58) Field of Classification Search .................. 709/203, 709/224, 201–207, 217–219, 220; 714/38; 719/311–316, 328; 715/501.1, 513, 744, 715/760, 762, 763, 769, 737, 738, 740, 745, 715/765; 717/100, 120, 121; 707/102, 823; 710/10

See application file for complete search history.

(56) References Cited

U.S. PATENT DOCUMENTS

| | | | |
|---|---|---|---|
| 5,600,778 A * | 2/1997 | Swanson et al. | 715/762 |
| 5,675,520 A | 10/1997 | Pitt, III et al. | |
| 6,628,305 B1 * | 9/2003 | Hong et al. | 715/734 |
| 6,748,555 B1 * | 6/2004 | Teegan et al. | 714/38 |
| 6,788,315 B1 * | 9/2004 | Kekic et al. | 709/203 |
| 6,904,563 B2 * | 6/2005 | Kumhyr et al. | 715/256 |
| 7,028,262 B2 * | 4/2006 | Estrada et al. | 715/751 |
| 2002/0143942 A1 * | 10/2002 | Li et al. | 709/225 |
| 2002/0147797 A1 * | 10/2002 | Paul | 709/220 |
| 2003/0126136 A1 * | 7/2003 | Omoigui | 707/10 |
| 2003/0126558 A1 * | 7/2003 | Griffin | 715/513 |
| 2003/0135609 A1 * | 7/2003 | Carlson et al. | 709/224 |
| 2003/0140120 A1 * | 7/2003 | Hartman | 709/219 |
| 2003/0167320 A1 * | 9/2003 | Perez | 709/223 |
| 2003/0184584 A1 * | 10/2003 | Vachuska et al. | 345/762 |

OTHER PUBLICATIONS

Omoigui, Nosa, U.S. Appl. No. 60/360,610 entitled "System and Method for Context and Time-Sensitive Knowledge Integration, Retrieval and Presentment," filed Feb. 28, 2002, 106 pages.

Omoigui, Nosa, U.S. Appl. No. 60/300,385 entitled "System and Method of Defining, Relating and Updating Objects to Provide Real-Time and Customizable Data Manipulation and Presentment:" filed Jun. 22, 2001, 50 pages.

* cited by examiner

*Primary Examiner* — H. S. Sough
*Assistant Examiner* — Charles E Anya
(74) *Attorney, Agent, or Firm* — Campbell Stephenson LLP

(57) ABSTRACT

A method and apparatus for configuring a user interface is disclosed. The method and apparatus allow for the determination of a function provided by the user interface using a skin. Such a skin includes information regarding an object, where the object represents an entity managed using the user interface.

16 Claims, 10 Drawing Sheets

METHOD AND APPARATUS FOR CONFIGURING A USER INTERFACE

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

This application includes a computer program listing appendix, submitted in duplicate on two identical compact disks with the file listed below, in ASCII format for "IBM-PC" compatible machines. The file is compatible with the MS-Windows and MS-DOS operating systems. The computer program listing appendix is hereby incorporated by reference in its entirety.

APPEND~1.TXT (48,236 bytes, created Apr. 1, 2002)

BACKGROUND OF THE INVENTION

1. Field of the Invention

The present invention relates to the management of entities (digitally controllable devices), and, more particularly, to a method and apparatus for the correct versioning of a graphical user interface extension.

2. Description of the Related Art

In today's computing environments, administrators find both themselves and their administration tools overwhelmed. The number and diversity of the devices and software that require management have grown at a precipitous rate in the past fifteen years, and have presented a number of challenges to the makers of system administration software.

These challenges spring from the ever growing number of increasingly complex hardware and software products. The problem of administration is compounded by attempts to integrate such products into a cohesive system. In response, the users of administration software have demanded the close integration of such software with the systems under management, in spite of an ever more fragmented and distributed development organization. For the makers of such software, having the same environmental requirements has led to duplicated efforts in multiple product groups. Alternatively, there have been attempts to create product specific administration tools. However, such uncoordinated approaches to similar requirements have often produced components that are hard or impossible to integrate with one another, and with the systems in which these components are to be used in conjunction with other such components. Moreover, similar or related information in multiple administration products can lead to inconsistency in the administration tools' representations of systems being administered.

Preferably, the maker of such administration tools should provide a heterogeneous solution that is capable of operating in mixed platform, mixed device environments. Also, simpler management should be enabled by integrating interaction points among disparate products (i.e., a single user interface to the devices and software under management). Seamless integration and presentation of administrative tasks, for example, via a unified administrative interface which simplifies operations and make them less error-prone.

For example, a unified administrative interface for the management of storage devices would be warmly welcomed in that community. (It should be noted that, while the example of storage devices is used in this discussion, the same challenges are faced in controlling any digitally controllable item.) While most of the concepts of networked storage are rooted in technology that has existed for several decades, there are recent developments in computing which have lead to drastically increased demands for storage space. This is due in a large part to the advent of massive unstructured data flows, observed to stem from the mass acceptance of the internet and its related methods of communications and dissemination of information, as opposed to those associated with structured data flows, typical examples of which are Enterprise Resource Planning (ERP) systems, and Electronic Document Interchange (EDI) systems. There is a growing need to effectively control and manage data storage activities related to these data sources. As such, new challenges are brought forth related to facilitate server and storage consolidation, non-disruptive back-up procedures, and minimizing the distance limitations of technologies preceding storage area networking.

This need has led to the development of what is commonly referred to as a 'Storage Area Network' (SAN). Within a SAN, host computers provide access to arrays of storage devices that can be either local or remotely located, and can be either centralized in one location or distributed over many. This variability and the complexity of such storage subsystems mandates that the host computers be coupled to devices that can route requests to the storage devices and make their actual configuration transparent to the end-user (e.g., 'storage routers'). This added network (the SAN) between the hosts and the storage devices, when properly set up and configured by an administrator, releases the end-user from the need to be concerned with the actual physical layout of the storage.

Traditional approaches to storage and storage management emphasize the need to control expense and restrict access. Prior technology has generally only enabled a given storage device to be accessible to a single server, so the latter goal is managed with relative ease though apparently working against achieving the former where there is such a one-to-one ratio of dependency. While one cost factor, that of the physical hardware performing the storage role, has exponentially decreased over the time since the advent of computing as a viable business tool, the cost associated with management now has continued to increase at an increasing rate, offsetting any benefits the former brings.

The important function of managing storage in a networked environment has proven to be generally difficult, and when comparing the approaches of management through a server-provided interface with storage-specific direct connect-based management (e.g., network attached storage (NAS) devices), a definite trend for success has been correlated with the latter. Just as data has been seen to come to be valued as an independent strategic asset from the computers that access it, storage networking products and architectures, as platforms for data protection and storage management are just now being elevated to the same level of concern.

To ensure reliability, redundant access is often supported, employing multiple routing devices, some of which may be distributed across geographically distant locations. Although a comparatively new technology, common existing implementations of SANs have to date been observed as failing in a critical area, that of not readily supporting extensibility.

An essential characteristic for a storage system is that it must be scalable if it is to support the increasing rate of growth of demand for storage space. Thus, with SANs, NAS systems and systems based on other storage paradigms, it can be expected that the complexity of their administration will increase rapidly, as well. It is therefore desirable to introduce greater simplicity into the management of such storage systems.

One challenge faced by the users of administration systems (i.e., administrators) is the need for a consistent user interface that enables the administrator to perform the requisite tasks, yet prevents inappropriate actions from being taken. Typically, an administrator is unable to make such a determination without either a priori knowledge of the devices/software being managed, or an investigation into the those devices/software. This is both time consuming and onerous, especially when such investigations must be performed in the face of constantly changing devices and configurations.

What is needed is a system that can provide a consistent user interface for an administration system in an up-to-date fashion without burdening the administrator with further administration tasks related to the investigation of their systems' current configuration and devices/software included therein. Moreover, such a system should provide configurability with regard to both the user interface's behavior (functionality), as well as its look-and-feel.

SUMMARY OF THE INVENTION

In one embodiment, a method and apparatus for configuring a user interface is disclosed. The method and apparatus allow for the determination of a function provided by the user interface using a skin. Such a skin includes information regarding an object, where the object represents an entity managed using the user interface.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION OF THE INVENTION

The following is intended to provide a detailed description of an example of the invention and should not be taken to be limiting of the invention itself. Rather, any number of variations may fall within the scope of the invention which is defined in the claims following the description.

Introduction

The present invention provides a method and apparatus for providing a consistent user interface for an administration system. This relieves the administrator of the burden of further administration tasks related to the investigation of their systems' current configuration and devices/software included therein. Moreover, such a system provides configurability with regard to both the user interface's behavior (functionality), as well as its look-and-feel.

In an administration architecture according to the present invention, administration software components are maintained on an administration client, which, in turn, presents administration information to a user (an administrator) via a GUI. The administration client receives information (in the form of client extensions) that enable the administration client to manage objects maintained on the object bus of an administration server. Together, one or more administration clients and one or more administration servers form the administration architecture. The objects represent the entities that are under management by the administration architecture.

A framework skin (or more generically, a skin) is a client-side software component (containing, e.g., methods that can be used to provided new functionality to the user interface (e.g., administration framework 215), configuration information and the like) that plugs into the administration framework that exists within the administration client. A framework skin is used to control the behavior of (the functionality provided by) the GUI of the administration framework and the behavior of client extensions within the administration framework. A framework skin can also be used to control the look-and-feel of the administration framework by supporting application-level customization of the GUI presented by the administration framework. A framework skin can thus be used to productize the default GUI (i.e., to make the GUI presented by the administration framework appropriate to a given commercially-available product, so that a user is presented with a standard interface with which the user can become familiar, even in subsequent products). A framework skin, in conjunction with client extensions, can also perform object-level customization in the given administration client.

An Example Administration Architecture

Figure 1:
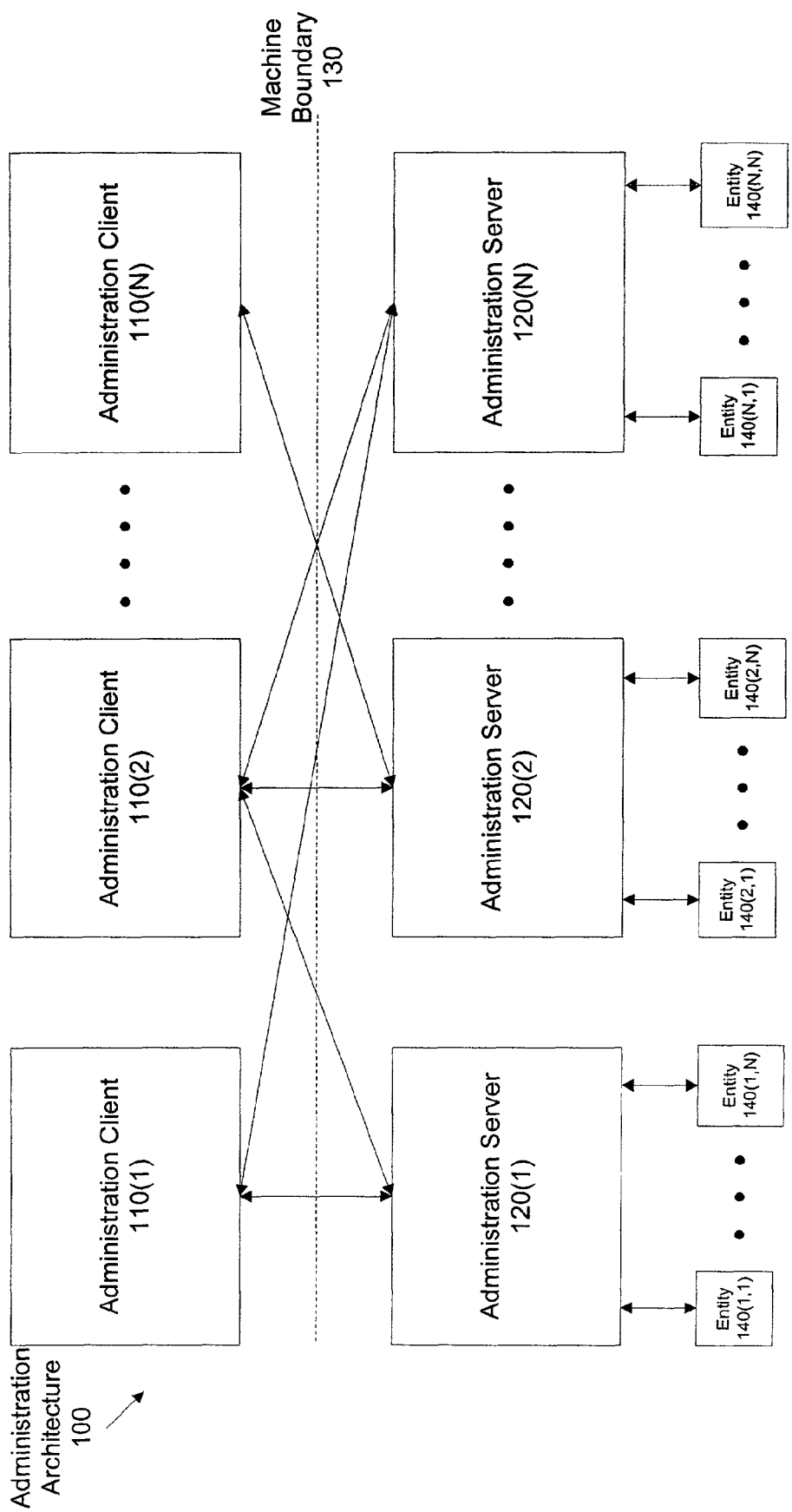
FIG. 1 is a block diagram illustrating an administration architecture.

FIG. 1 is a block diagram illustrating an administration architecture 100 according to the present invention. Administration architecture 100 includes a number of administration clients (administration clients 110(1)-(N) that are variously in communication with a number of administration servers (administration servers 120(1)-(N)). While one or more of administration clients 110(1)-(N) may be co-located with one or more of administration servers 120(1)-(N) on a single computer system, administration clients 110(1)-(N) and administration servers 120(1)-(N) are typically located on separate computer systems. Such a situation is portrayed in FIG. 1 by a machine boundary 130. Administration architecture 100 provides the requisite functionality for a number of entities (depicted in FIG. 1 as entities 140(1,1)-(N,N)). Entities 140(1,1)-(N,N) represent any one of a number of items capable of being digitally controlled. For example, entities such as storage devices can be managed using administration architecture 100, as will be apparent to one of skill in the art. However, a wide variety digitally controllable devices can be managed using administration architecture 100. For example, many industrial lighting installations are currently digitally controlled. Such installations can easily be managed by an administrate architecture such as administration architecture 100. FIG. 1 also illustrates the following concepts:

Support of local and remote administration clients

Communication between administration clients and administration servers

As noted, an advantage of such an architecture is that an administration client and an administration server are independent of the semantics of the objects under management. Providers provide the necessary semantics of objects on the server side (for the administration server), while extensions (client extensions) provide the necessary semantics of objects on the client side (for the administration client).

It will be noted that the variable identifier "N" is used in several instances in FIG. 1 to more simply designate the final element (e.g., administration clients 110(1)-(N) and administration servers 120(1)-(N)) of a series of related or similar elements (e.g., administration clients and administration servers). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

Figure 2:
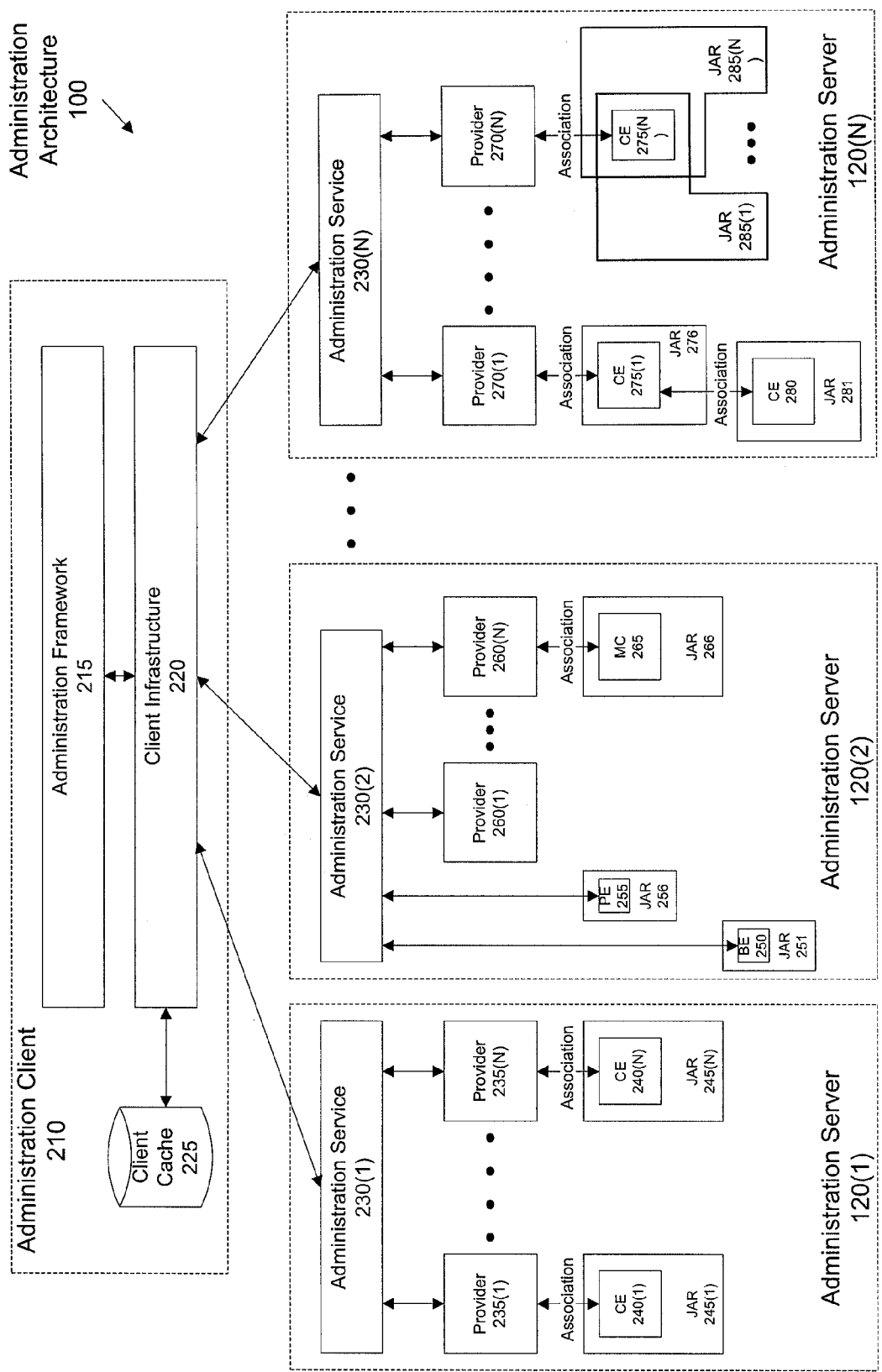
FIG. 2 is a block diagram illustrating an administration architecture such as that depicted in FIG. 1 in greater detail.

FIG. 2 is a block diagram illustrating certain portions of administration architecture 100 in greater detail. As before, administration architecture 100 includes an administration client (depicted in FIG. 2 as administration client 210, and corresponding to any one of administration clients 110(1)-(N) of FIG. 1) and a number of administration servers (depicted in FIG. 2 as administration servers 120(1)-(N), as in FIG. 1). As depicted in FIG. 2, administration client 210 includes an administration framework 215 coupled to a client infrastructure 220. Client infrastructure 220 has access to a client cache 225, in which client extensions and other entity management information are stored.

Client extensions support provider-based GUI components and events. If a provider requires GUI items and events not supported as defaults within the GUI, a client extension is typically implemented (rather than altering the GUI). By implementing entity-(and so object-) specific GUI functionality in client extensions, administration architecture 100 allows an administration framework to be implemented more simply than would otherwise be possible using other GUI alternatives. Over time, this translates into a vastly simpler GUI—there is not the constant addition of support for new entities and their features, as with other GUI alternatives. Thus, while such an administration framework is able to continue to provide a simple GUI, such an administration framework is also able to offer the power to easily administer new or altered entities by using a new client extension downloaded from the given administration server.

Unsupported GUI items provided by a client extension might include, for example, context menus, property sheets, property notifications, and/or asynchronous displays specific to a given provider (object, and so, entity). Thus, the GUI can remain small, adding the functionality needed to manage a given entity on an as-needed basis. This prevents the GUI from becoming large and unwieldy, as a large GUI can be difficult to update and maintain, and can create strain on client systems by making inordinate demands on system resources. Client extensions are typically implemented in the context of a framework skin. Client extensions and framework skins are discussed in greater detailed subsequently, in connection with FIGS. 3 and 4.

Administration framework 215 contains GUI components which can be customized by application writers. Administration framework 215 typically provides tree and table views for browsing objects maintained in one or more of administration servers 120(1)-(N). When an entity is integrated with one of administration servers 120(1)-(N) in the back-end (that is, through a provider), a user can use the GUI provided by administration framework 215 to browse one or more objects representing the entity. In order for the user to perform entity-specific operations and update the GUI with entity-specific customization, client extensions are written and provided to administration framework 215 via providers within administration servers 120(1)-(N). An application writer can also perform application-level customization through the implementation of framework skins. Fundamentally, administration framework 215 provides utilities for building GUI components, as well as utilities for communicating with client infrastructure 220, as described subsequently.

Also depicted in greater detail in FIG. 2 are administration servers 120(1)-(N). Included in each of administration servers 120(1)-(N) is a respective administration service (depicted in FIG. 2 as administration servers 230(1)-(N), respectively). Each of administration servers 120(1)-(N) provide an object bus (not shown) which maintain the aforementioned objects representing entities. As depicted in FIG. 2, each of administration servers 120(1)-(N) includes a corresponding one of administration services 230(1)-(N), as well as a set of providers (providers 235(1)-(N)). Providers 235(1)-(N), as discussed in greater detail subsequently, provide for the creation and management of objects within administration services 230(1)-(N). As depicted in FIG. 2, each of providers 235(1)-(N) is associated with a client extension (correspondingly depicted in FIG. 2 as client extensions 240(1)-(N)) (although, as noted subsequently, a client 2Q extension is not mandatory). Each of client extensions 240(1)-(N) is provided to administration client 210 via administration service 230(1)-(N), and stored by client infrastructure 220 in client cache 225. Such cached client extensions are used by administration framework 215 to browse the objects created by providers 235(1)-(N) (and representing one or more entities under management), and stored in administration service 230(1)-(N).

As can be seen in FIG. 2, client extensions are contained in Java Archive (JAR) files (shown respectively in FIG. 2 as JAR files 245(1)-(N)). The packaging of client extensions, including the classes for the extension, view information (including, e.g., icons, images, HTML pages, and so on) and other relevant information are packaged in a JAR file for transmission to administration client 210 for caching in client cache 225. Alternatively, it should be noted that administration architecture 100 is not restricted to the use of Java-based client extensions. As will be apparent to one of skill in the art, other techniques for making the information regarding objects maintained in an administration service can be employed. For example, it is possible to write a shell script client that can download shell scripts within administration client 210. Such shell scripts can provide the necessary semantics to client infrastructure 220, and ultimately administration framework 215, to allow administration framework 215 to provide support for browsing the objects maintained in the given administration service (e.g., administration service 230(1)).

In fact, as depicted in administration server 120(2)-(N) of FIG. 2, special types of extensions can be made available to an administration service. Moreover, a provider need not employ a client extension, and may also employ a message catalog (to allow for internationalization and the like). Thus, both a client extension and message catalog are optional. Administration server 120(2) is shown as including administration service 230(2), which in turn supports a bootstrap extension 250 (contained in a JAR file 251) and a persistent extension 255 (contained in a JAR file 256), as well as a number of providers (depicted as providers 260(1)-(N)). Bootstrap extension 250 is called once to assist in the bootstrapping of a given administration service, to assist the given administration service with initial configuration issues. Persistent extension 255 is an extension that is called on every object, and so controls one or more other extensions in general configuration issues (e.g., options such as which menus are displayed and the selections provided on any given menu). This differs from a framework skin or master extension (discussed subsequently in connection with FIG. 3A), which are maintained on the administration client (and so are client-centric), because persistent extension 255 is associated with an administration server (and so is server-centric).

In another alternative, provider 260(1) is shown as having no client extension. This might be the case, for example, where provider 260(1) is a software package such as a disk manager, a volume manager, a policy engine, a licensing module or the like. In yet another alternative, provider 260(N) is depicted in FIG. 2 as being associated with a message catalog 265, which is, in turn, contained in a JAR file 266. A message catalog, such as message catalog 265, contains messages that are presented by, for example, administration framework 215 during the operation of administration framework 215 (e.g., the presentation of information regarding objects maintained in administration service 230(2)). The functionality provided by a message catalog such as message catalog 265 is discussed subsequently in conjunction with the discussion of internationalization.

While client extensions are typically shown herein as being singly-dependent modules in their respective administration server, this need not be the case. Client extensions can, in fact, be configured to communicate with one another. For example, administration server 120(N) is depicted as having a provider (one of providers 270(1)-(N) (i.e., provider 270(1)-(N)) that is associated with a client extension (one of client extensions 275(1)-(N), client extension 275(1)) that has a dependent client extension. Client extension 275(1) (which is contained in a JAR file 276) is further associated (is dependent on) another client extension (a client extension 280, which is in turn contained in a JAR file 281). Alternatively, although not shown, a (child) client extension may depend from a JAR file, rather than depending directly from another client extension (the parent client extension). In that case, the client extension that was originally contained in the JAR file exports some or all of its library(ies) for access by the dependent client extension. Thus, by either accessing the parent client extension directly or by accessing the parent client extension's exposed library functions, the child client extension can communicate with the parent client extension and employ the parent client extension's libraries. The subject of dependencies between client extensions is discussed subsequently.

Moreover, client extensions may have access to more than one JAR file (e.g., to a variety of libraries in their respective JAR files). Such a situation is depicted in FIG. 2 by the client associated with provider 270(N), client extension 275(N). Client extension 275(N) has access to a number of JAR files (depicted in FIG. 2 as JAR files 285(1)-(N)). JAR files 285(1)-(N) can include, although are not limited to, third-party library JAR files. Multiple dependencies are also discussed subsequently.

Administration Architecture Operational Overview

An administration server according to embodiments of the present invention typically thus includes three basic components:

1. Common Object Repository (also referred to herein as an object bus, which stores objects created and then plugged into the administration service);
2. Provider (an object-specific plug-in software component, which introduces managed objects into the administration service and allows management of those objects); and
3. Client Extensions As briefly noted, each of administration servers 120(1)-(N) includes an object bus which maintains objects representing entities 140(1,1)-(N,N).

Typically, designs employing an administration server, such as are depicted in administration architecture 100, include two major components:

1. An entity-specific (e.g., product-specific) Provider, and
2. An entity-specific (e.g., product-specific) Client Extension.

Providers are "plugged into" an administration service and provide product-specific functionality in terms of objects and interfaces, in order to provide services and object management. Client extensions "plug into" the given administration framework and provide a GUI customized for product-specific characteristics, using operations which are appropriate to the given object(s) (entity or entities). As shown in FIGS. 1 and 2, administration servers 230(1)-(N) support client communication on multiple servers with individual object repositories, and offer a standard method for managing different types of entities (e.g., storage objects).

Administration client 210 provides functionality that allows a user to browse such object representations by graphically representing the object representation in a manner specific to the entity thus represented by attaching to the object bus, and so provides manage capabilities for these objects. Specifically, administration framework 215 supports a graphical user interface (GUI) that allows for the display of the desired objects. Administration framework 215 supports a unified console that can manage a variety of entities and their respective objects. Such a console is dynamically extensible with specific provider provided user-interface (GUI) extensions (i.e., client extensions). In support of these functions, an administration service provides various generic mechanisms to create and delete objects, create object interfaces, capture and deliver object-change notifications, organize objects, and so on. Application program interfaces (APIs) are provided to assist in communication with providers and among related software components.

Administration client 210 provides:
1. ease of integration of operations through administration servers 120(1)-(N) and entity-specific providers
2. a management graphical user interface (GUI) referred to herein as an administration framework, which is capable of receiving plug-in product-specific GUI extensions (client extensions)

An additional module can also be provided to enable Native Client functionality. This can be represented by a set of APIs which can be used to develop a C/C++ Native (Non-Java) client capable of connecting to an administration server, fetch objects, perform operations on objects and so on. The administration server infrastructure also provides various generic mechanisms to create and delete objects, create object interfaces, capture and deliver object change notifications, organize objects, and so on. Application program interfaces (APIs) also assist in communications with vendor-created providers.

Administration architecture 100 provides a number of advantages. Administration architecture 100 enables tight, efficient integration and management of objects (which represent the entities being managed), while supporting greater flexibility in the objects supported and their interfaces (a collection of methods that can be applied to an object). Each object is capable of supporting a number of interfaces, which can be internal or external. This allows objects to present different APIs for use by different consumers. For example, a disk object managed by an administration service can support a disk interface applied to the administration service by a disk provider, as well as a volume manager disk interface applied by a volume manager. Interfaces associated with actual objects are concrete, in that the interface methods are filled in with actual code. Therefore, a volume manager sub-disk interface defines one set of methods, but a new layout table extent defines a different set of methods for its interface.

Administration services 230(1)-(N) provide an application program interface (API) for object management (creation, deletion, querying, and so on), property set manipulation, event management, memory management and provider operation invocation. The native client and provider use API calls to interact with administration services therein. This API is discussed subsequently, in conjunction with registry services that may be employed by administration architecture 100.

Administration client 210 includes a Java-based client infrastructure (client infrastructure 225). Product- and provider-specific client extensions (which are extensions to the GUI) can then be plugged into client infrastructure 225, as noted previously. Client infrastructure 225 also supports communication and data exchange between an administration server or client infrastructure, and client extensions.

If a product does not require a Java GUI, the product can use a client API provided by the associated administration server (discussed in detail subsequently). If, for example, Provider A wishes to invoke an operation on an object, Provider A determines which object to invoke an operation on by specifying the object's Object ID, and then invokes the provider-specific control call operation, which uses the opcode of that operation. Provider A is loaded by the associated administration service, and the administration service determines which provider handles the operation on the specified object.

On the client side (for both native clients, as well as Java-based client extensions), an instance of client infrastructure 220 caches objects from the given administration server onto client cache 225. If a native client or client extension issues any property searches, those refer to the local cache. However, all invocations of control call operations on the objects are relayed to the appropriate administration server. Any modification to objects on the server side results in notifications to all clients, which then update their respective client caches. Object modifications initiated from administration client 210 should be in the form of object operations. A client is not typically allowed to set a property on an object from the client side. Such a change will typically not be reflected within the associated administration service (specifically, the object repository thereof). However, if the provider in question modifies any object, the administration service (specifically, the object repository thereof) is updated appropriately.

Administration client 210 and administration servers 230(1)-(N) implement a distributed object management paradigm for the storage of a system model composed of the following elements:
  object types
  objects
  object hierarchy
  object manipulation APIs
  object data atoms This paradigm serves as a standard for managing different types of data objects by defining the organization of the data objects that comprise the object hierarchy, methods, and object data atoms.

As will be apparent to one of skill in the art, the objects discussed herein are the locus around which most of administration architecture 100 is built. An object typically has a global unique identifier (GUID), a type, a collection of properties, relations to other objects and a set of associated interfaces. Providers plug into their respective administration service to provide services, as well as to create and manage such objects. The infrastructure provided by administration servers 230(1)-(N) offers a convenient environment for interoperability among multiple entities such as software applications and hardware components, and so provides for the ready integration of such entities in a lightweight and cross-platform environment.

Administration architecture 100 consists of at least one administration client and at least one administration server. In general terms, an administration server such as includes an object repository that stores objects created by providers. The server's address space includes a shared library known as a provider. When running, the provider controls the resource to be managed. The provider hides all the resource-specific operations and details from the rest of the system and creates an abstract representation of the resource in the server-object repository. Examples of an administration client and an administration server appropriate to administration architecture 100 are described below.

An Example Administration Client

Administration client 210 interacts with administration server on one side and provides transparent interface mechanisms for implementing graphical user interface (GUI) applications to manage the resources represented in client cache 225. The client includes two basic components:

1. Administration framework 215—Administration framework 215 is used to provide client applications, and contains GUI components that can be customized by application writers. Client extensions for performing operations and updating the GUI with provider-specific customization can be written (these are provided by providers, as shown in the preceding figures). Framework skins for performing application-level customization can also be implemented.

2. Client infrastructure 220—Functionally, client infrastructure 220 is similar to the server-side component (within the administration service). Client infrastructure 220 communicates with one or more administration servers to use the services exposed thereby. Client infrastructure 220 maintains a cache (the client cache) to store objects fetched from the administration server(s). In general, client infrastructure 220 acts as the bridge between the GUI and the administration server.

Figure 3A:
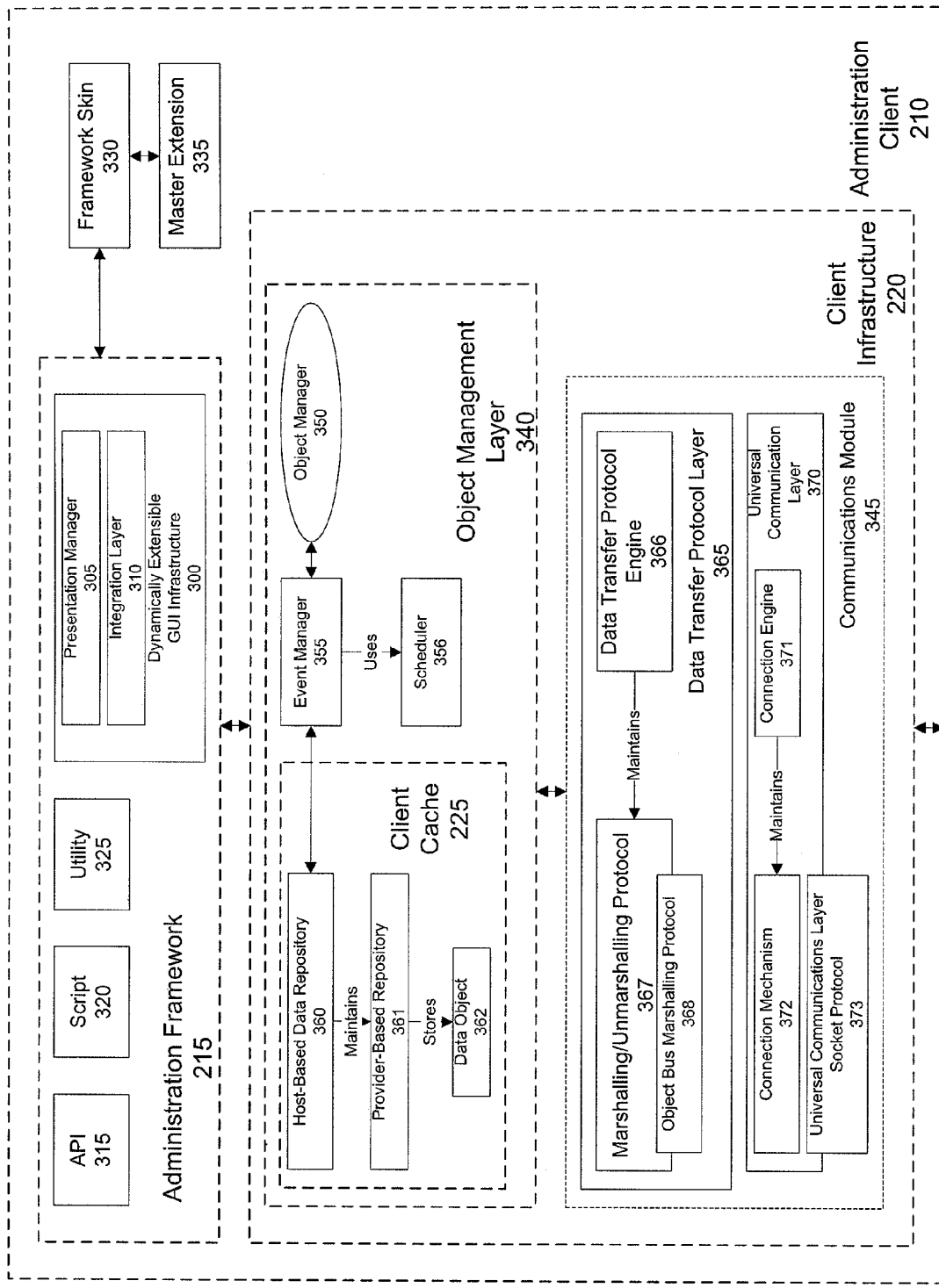
FIG. 3A is a block diagram illustrating an administration client in more detail.

FIG. 3A is a block diagram that illustrates in further detail administration client 210. As illustrated in FIGS. 1 and 2, administration client 210 includes administration framework 215, which is coupled to client infrastructure 220. As subsequently discussed in greater detail, client infrastructure 220 provides administration framework 215 access to cached information held in a client cache (e.g., client cache 225 of FIGS. 1 and 2). Client infrastructure 220 also provides communication services that allow administration framework 215 to communicate with one or more of administration servers 120(1)-(N) (or, more specifically, with administration services 230(1)-(N)). Included in administration framework 215 is a dynamically extensible GUI infrastructure 300 (GUI infrastructure 300), which further includes a presentation manager 305. Presentation manager 305 communicates with client infrastructure 220 via an integration layer 310. Also included in administration framework 215 is an application programming interface (API) 315. API 315 allows a programmer to write software that can directly interact directly with client infrastructure 220 through administration framework 215 and so provide object management (creation, deletion, querying, and so on), property set manipulation, event management, memory management and provider operation invocation. In a somewhat similar fashion, administration framework 215 can support a script 320 and/or a utility 325, which are similarly capable of interacting with client infrastructure 220. Cumulatively, administration framework 215, applications using API 315, script 320 and utility 325 are referred to herein as "clients".

In terms of client infrastructure 220, a client is a collection of applications which employ client infrastructure 220 in the managing and storage of objects (here, representing the entities being managed), whereas a single application employs client infrastructure 220 to collect and manage data from an administration server.

Functionality provided by a client infrastructure such as client infrastructure 220 typically includes:
1. Interaction with one or more administration servers to use their services (e.g., object repository, object management and monitoring, and event management, among others).
2. Exposing the functionality of providers.
3. An enterprise-wide view for entities (e.g., storage objects).
4. Supporting communications between client applications and one or more administration servers.
5. Caching of objects fetched from one or more administration servers.
6. Data object management such as, for example, traversing through attributes and performing operations.
7. An abstract marshalling and un-marshalling mechanism, which provides an interface to plug-in application-specific components.
8. Abstract communication with one or more administration servers.
9. Support for client applications to register for receiving and processing selective events and notifications from one or more administration servers.
10. Support for a generic interface for building client applications.

Client infrastructure 220, a middleware framework, acts as a bridge between an administration client and one or more administration servers. Client infrastructure 220 manages the object repository and data objects, communicates with the administration server(s), and provides APIs to the client for access to the objects and services. Client infrastructure 220 also allows for the management of distributed data.

As can be seen in FIG. 3A, administration framework 215 also has access to a framework skin 330, which in turn has access to a master extension 335. Framework skin 330 and master extension 335 allow a programmer to control the behavior of administration framework 215, and in particular, of presentation manager 305.

Framework skin 330 is a client-side software component that plugs into administration framework 215. Framework skin 330 is used to control the behavior of the GUI provided by administration framework 215 and the behavior of client extensions within administration framework 215. Framework skin 330 can also be used to control the look and feel of administration framework 215 by supporting application-level customization of the GUI presented by administration framework 215. A framework skin can be used to productize the default GUI (i.e., to make the GUI presented by administration framework 215 appropriate to a given commercially-available product). Framework skin 330, in conjunction with client extensions, can also perform object-level customization. Framework skin 330 and master extension 335, the specifics of their programming, the functionality that they provide and other facets of their operation are discussed in greater detail subsequently.

As noted, administration client 210 allows administration framework 215 to interact with one or more of the administration servers 120(1)-(N), as well as cache information that allows administration framework 215 to browse objects maintained in administration services 230(1)-(N). Included in client infrastructure 220 is an object management (OM) layer 340 and a communications module 345. OM layer 340 supports this caching of information, which includes information used by administration framework 215 to access the objects that represent entities under the management of administration architecture 100. OM layer 340 includes an object manager 350 which performs tasks related to the management and maintenance of objects held in client cache 225. OM layer 340 acts as a repository or cache (thus the inclusion of client cache 225) for the objects in client infrastructure 220, which as managed by object manager 350. Object manager 350 defines the organization of the various objects comprising the object hierarchy, relationships, and methods.

Object manager 350 communicates with an event manager 355, which in turn employs the facilities provided by a scheduler 356. Event manager 355 maintains a list of providers registered for various events. When an administration server generates an event, the administration server interfaces with event manager 355 to notify registered providers. Event manager 355 also enables providers to wait for an event to occur by using, for example, wait criteria functions and time outs.

Event manager 355 also interfaces with client cache 225, which includes a number of modules. Client cache 225 supports a host-based data repository 360, which in turn maintains a provider-based repository 361. Provider-based repository 361 stores data objects (exemplified by a data object 362 in FIG. 3A). In simplified terms, client cache 225, via host-based data repository 360 and provider-based repository 361, maintain items such as data object 362. Data object 362 represents information such as data objects representing entities under management or client extensions (discussed elsewhere herein), and so allows such information to be cached on administration client 210. This allows the maintenance of such information locally, thereby minimizing the need to communicate with a given application server.

Communications module 345 supports communications between administration framework 215 and administration servers 120(1)-(N). Communication module 345 includes a data transfer protocol layer 365, which further includes a data transfer protocol engine 366. Data transfer protocol engine 366 maintains a marshalling/unmarshalling protocol 367, which in turn includes an object bus marshalling protocol 368. Communications module 345 also includes a universal communication layer 370. Universal communication layer 370 includes a connection engine 371. Connection engine 371 maintains a connection mechanism 372 which employs a universal communication layer socket protocol 373.

An Example of a Client Extension

In one embodiment of the present invention, administration client 210 and its GUI are based on the Java programming language. To enable user interface (UI) extensions to be added to such administration clients, administration architecture 100 provides a GUI infrastructure and a client extension interface that can be implemented to support provider-based interface (UI) components and events. If a provider requires UI items and events that are not supported in the main UI, a client extension can be implemented to provide the requisite functionality. (Unsupported UI items might include, for example, context menus, property sheets, property notifications, or asynchronous displays.)

Client extensions are typically employed by an administration client (specifically, an administration framework) when the administrator wishes to browse/administer a given entity (represented by an object maintained on a corresponding administration server). If the administration client (specifically, its client infrastructure) has not cached the client extension for this object, the administration client accesses the object's provider via the administration server. The provider supplies the requisite client extension to the requesting administration client, which in turn caches the client extension using the administration client's client infrastructure. Once available for use by the administration client, the client extension controls administration (management) of the object (and so, the entity) by configuring the functionality provided by the administration client's GUI for the object (entity) being managed according to the information contained in the client extension.

Referring again to FIGS. 2, 3A and 3B, a client extension is packaged as a Java JAR file. (A Java JAR file is a JavaARchive file format used to aggregate multiple files into a single file.) Each JAR file contains the run-time for the given client extension. Typically, the given JAR file also contains information such as the images, icons, and HTML pages required by the extension.

The following process is followed in creating a client extension. Preferably, the modules of a client extension are arranged hierarchically. The entry point for the client extension (actually, the JAR file) includes method calls for retrieving the implementation of sub-modules in the client extension. To create a client extension, the following procedures are performed:

1. Design GUI counterparts for the provider-supported functionality.
2. Design interactions between the client infrastructure and the client extension.
3. Implement the client extension interfaces.
4. Make a Java ARchive (JAR) file of the extension.
5. Copy the JAR file to the server.
6. Put the entries for the extension into the registry.

The next section describes the procedures and steps required to create an example client extension, a bulb extension.

Extension Example

An example of a client extension is now described. The example, a lightbulb client extension (or "bulb extension"), supports the display and customization of bulb objects. The bulb objects are of two types: Bulb and Tube. The bulb object includes an interface that features On/Off operations. This interface is referred to as the OnOff Interface. The Tube object includes the interfaces of the Bulb object, as well as an additional interface for setting the brightness of the bulb. This interface is referred to as the Brightness Interface. The bulb extension should provide the following features:

1. Various icons, depending on the state of the bulb.
2. Support for the OnOff and Brightness interfaces, by providing specific operations (via menus, popup menus, and toolbars).
3. An additional view.
4. An additional property page.
5. A description of the bulb.
6. Capability to override the default bulb name.

It will be noted that the code for the following functions can be found in Appendix A.

Entry Point

Each client extension should have a well-defined entry point. The entry point acts as a gateway for an administration client to query interfaces on the client extensions. The entry point provides handles into various sub-modules used to customize the GUI provided by the administration framework. The IClientExtension interface is the entry point of the client extension. This interface is used by the administration framework to interact with the client extension. The client extension can return null for a method under the following circumstances:

1. The client does not want to customize the GUI using that method.
2. The client wants to use the default components provided by the GUI framework.

Modules

The following submodules are defined in the base framework:

Common Interface
Icons
Top-level Menus and Pop-up Menus
Toolbars
Additional Views
Property Pages
Existing Views
Multiple Selection Views These submodules are described below, and their respective code appears in Appendix A.

Common Interface

The ICommon interface returns any general data included in the client extension. This data can be used by any or all of the views. ICommon can be used to retrieve the following information or objects:

1. An icon interface, IIcon, that includes properties for specifying the icon of an object, the overlay on the icon, and whether the icon can be overridden by another extension.
2. The display name by which the object is recognized. This string can be used by the views to display the name for the object.
3. The tooltip that the client extension wants to display for the object.

Icons

The IIcon interface customizes icons in the GUI. This interface is used by the views to obtain the icon object and its attributes. IIcon is used to retrieve the following information or objects:

1. The overlay on the icon for the object.
2. Whether any other client extension or components can override its image on the image shown in the tree node for the object.

In addition to implementing the IIcon interface, the client extension should also implement the getIconHandler( ) method of the ICommon interface. This method returns the IIcon implementation.

Top-Level Menus and Pop-up Menus

The IMenuCustomizer interface is used by the menubar of the GUI framework. IMenuCustomizer is used to perform the following functions:

Add menus to the menubar.
Update and add menus and menu items in
1) the main menu bar of applications, and
2) the pop-up menu displayed after a right-click on an object.

The client extension should implement this interface to customize the menu, and should return the implementation in the getMenuHandler( ) call of the IClientExtension interface.

Toolbars

The ItoolbarCustomizer interface updates the toolbar of the application. (The IToolBarArea interface updates the tool-bar area.) The client extension should implement the ItoolbarCustomizer interface to update the toolbar after an object is selected. It will be noted that a toolbar is depicted in and briefly discussed in connection with FIG. 7.

Additional Views

The IView interface defines a view in the Object Browser framework. New views that are to become part of the GUI presented by administration framework must implement the IView interface.

Property Pages

The IPropertyPage interface defines a property page in the Object Browser framework. A property page should implement the IPropertyPage interface.

Existing Views

The ICustomize interface customizes the existing views. The view receives this object type from the client extension, then executes the APIs defined in the object. ICustomize can pass to the client extension any object that can customize the view. The client extension returns this interface if the client extension wants to customize a view, or can return null if the client extension does not want to customize the view. The view and the extension must understand the APIs of the customizing object. The view defines the customizing object, while the extension understands the customizing object. The customizing object can be passed to the extension through the APIs of the interface. The default GUI views can be customized using the customizers specific to their views. The TableViewCustomizer interface is used by the client extension to customize the Table View.

Multiple Selection Views

The IView implementations in the administration framework define views in an application. Each view is a visual representation of objects from the data source (i.e., the entity's representation). Each view exists in the context of a particular framework skin (as discussed elsewhere herein). Objects can be selected in these views. If the view allows a user to select more than one object simultaneously, the view is "multiselect-enabled." When used with a volume manager provider/client extension, for example, multiple selection allows a user to add multiple disks to a disk group at the same time by selecting the disks simultaneously in a table view.

Default Views in Framework Skin

A tree view and table view can be "multiselect-enabled", by customization (by a client extension) to provide such multiple selection.

Multiple Selection View Creation

If a client extension writes a new view, no restrictions are imposed by the GUI framework on the number of objects that can or should be selected. The views are responsible for updating the GUI on selection events. In addition, the views can use the methods exposed in the ob.gui.core.event.EventHelper class to fire events for the framework and to selectively update components in the GUI in the context of the selected object(s). If the TableView is not enabled for multiple selection, it must be enabled for the capability by a client extension providing a multi-select customizer.

Using Client Extensions to Customize Table View for Multiple Selection

The TableView can be made multiselect enabled through a client extension. The TableViewCustomizer object can be used to set this feature on or off. A MultiSelect Customizer must be implemented for events related to multiple selection.

//set Multi Select where itc is the Table Customizer
//instance received in update method.
itc.setMultiSelect(true);

Enabling a Table for Multiple Selection

TableView Customizer can be used by an extension to set MultiSelect( ) with true/false values. True enables and false disables the multiple selection capability in the view. For example, the harness extension includes an ICustomize object that is returned when get customizeHandler is passed through TableView as a parameter. The liable calls the update method of ICustomize, and ITableCustomizer is passed as a parameter. The ICustomize object from the client extension uses ITableCustomizer to enable the table for multiple selection. At this point, the user can make multiple selections on the table.

Customizing GUI Components for Multiple Selection in a Table

When a selection event occurs in the framework, the menubar, toolbar, and pop-up menus are updated in the context of the selection. This selection can be customized by a client extension. For multiple selection, the client extension must implement IMultiSelectCustomizer. Each view can call the getViewCustomizerHandler(IView view) method of a client extension and pass a MultiSelectView object.

In this case, the client extension should return the IMultiSelectCustomizer implementation. The updatemenubar, updatePopupMenu, and updateToolbar methods of this customizer are called by the ITable. For example, the harness extension returns IMultiSelectCustomizer on getViewCustomizeHandler when MultiSelectView is passed as a parameter. In this customizer, the harness extension updates the menubar, menu, and toolbars. When two objects are selected in the ITable view and the mouse is right-clicked, the ITable calls updatePopupMenu of the customizer and displays the updated pop-up menu.

Client Extension Capabilities

Client extensions can expose different types of capabilities, such as the customizations the client extension is interested in making or whether the customizations are interface-enabled. The capabilities are retrieved from a client extension so that processing decisions can be made. Client extension capabilities are preferably exposed as a property set that is returned in the getCapabilities call of the client extension. For example, a client extension can enable a capability such as "Interface Enabled" by setting that capability to true. If the capability is enabled, update calls are made to the different modules of the client extension by passing the interface (GUID) as a parameter. Example code in the call to client extension getCapabilities can be written as follows:

```
public PropertySet getCapabilities( )
{
PropertySet capabilities=new PropertySet( )
capabilities.insert(CapabilitiesConstants.INTERFA-
CE_ENABLED,
  new Bool(true), 0);
  return capabilities
}
```

Interface-Enabled Customization

An object can have several client extensions associated with it. All client-extension customizations are consolidated by the framework and presented in the GUI. During consolidation, the modular calls to each client extension are made to update the component. The calls for updating are made in the order in which the interfaces are present on the object. For example, object O1 has extensions E1, E2, E3, and E4 associated therewith, and the programmer desires to show the pop-up menu supported on this object. The updatePopupMenu method is called on each extension, and the consolidated effect is shown in the GUI. If E1 and E3 are actually the same extension (that is, they have the same JAR file and the same implementation), it is preferable not to make the update in duplicate. For instance, if the update call is adding a menu item without checking for its previous existence in the pop-up menu, the menu appears twice. To avoid this situation, the client extension provides interface-based updating.

Interface-Based Updating

When consolidating extensions, the administration framework checks to determine whether the extension is interface-enabled. If the extension is interface-enabled, the administration framework makes the update call to the client extension, passing the GUID for the interface (or interfaces) for which this call is made as a parameter. If the client extension is not interface-enabled, the administration framework updates the calls without the interface vector parameter. If the client extension is not interface-enabled but appears to be duplicated because more than one interface is sharing the extension, the administration framework calls the update on the extension only once. In this case, no update is duplicated. If a client-extension writer uses the same client extension for two different provider interfaces, the client extension can enable exchange capabilities and switch on the interface ID in the update calls.

For example, a tube object is also, by definition, a bulb object. A bulb object has a Switch On/Off interface. A tube has one extra Set Brightness interface. To use the same client extension for the bulb and the tube objects employs code listed in Appendix A. In this code, the interface list for a bulb object that is not a tube contains only one object, the Bulb Interface ED. Consequently, the Bulb on Action and Bulb Off Action are added to the Bulb menu. If the object were a tube, the object would have two entries in the interface vector. In that case, the On/Off Actions would get added because of the Bulb On/Off interface, and the Set Brightness action would get added to the menu because of the tube brightness interface.

Dependent Extensions

Client extensions can specify their dependencies on other extensions/libraries, as depicted in FIG. 2 with regard to administration server 120(N). Class loading for dependent extensions can be implemented in the following manner, according to embodiments of the present invention. To make an extension dependent on another extension (e.g., extension A dependent on extension B) for a particular administration framework, the registry entries for extension A should provide some indication of the dependency's existence (e.g., should have a DependsOn key set). Registries are discussed in detail in connection with FIG. 6. The value of this key should be the symbolic name of client extension B. Each client extension on a particular administration framework is typically loaded through a unique class loader. The administration framework resolves the dependencies prior to loading this client extension.

When client extension is required for the first time, a check is performed to see if the loader for this client extension exists. If not, a class loader is created. This class loader is created such that the class loader for the dependent client extension (client extension B) is set as the parent loader for the class loader for the dependent client extension (client extension A).

The findClass call of any of the class loaders first tries to find the desired class in the parent class loaders. If the desired class is found in any of the parent class loaders, the desired class is loaded in and returned from the parent. In case the desired class is not found in the dependent client extension JAR files, the class is searched for in the JAR file of the current client extension. In this way, instantiated objects of a particular class are loaded from the same unique class loader and the class definition remains consistent. This facilitates passing of objects between client extensions. The inter-client extension communication feature proceeds as follows.

Inter-client extension communication is supported in an administration architecture according to embodiments of the present invention. Client extensions can communicate with each other using the mechanism provided by the administration framework. If client extension A wants to use a specific instance of an object from client extension B, client extension A should be dependent on client extension B. Furthermore, client extension B should return the required object in its getObject call.

Steps to use the same object instance are now described. If it is desired that client extension A use an object instance from client extension B, then:

1. In the registry, entries are made for client extension A to be dependent on client extension B using Symbolic Name and depends-on keys.

2. In client extension B, the getObject(Object key) method is implemented to return the instance of the sharable object given a particular object as a key. In this way, several objects can be shared using different keys.

3. In client extension A, the interface provider for client extension B is obtained and use the admin.ob.gui.utils.ExtenisonUtility class to get client extension B.

4. Now the getObject( ) call is made on the client extension object, passing the appropriate key object.

Java objects, framework objects, common interfaces, objects and static objects can all be shared between client extensions (e.g., client extensions A and B).

The client extensions can specify dependencies, for example, in the form of Symbolic Names. The administration framework downloads extensions/libraries from the server corresponding to the Symbolic Names, and uses the same class loader to load both the library and the extension. Each client extension can thus have a SymbolicName for representation in this manner. This is represented as a String Value for the GUID in the registry (for client extensions).

Dependency consists of a list of commas separated by Symbolic names (for the extensions). The JAR file corresponding to the same framework skin, platform, and locale is obtained from the dependent library. Dependency is not restricted only to extensions, but can be any Java JAR file. Dependency can be defined on two levels:

1. StrictDependency: All dependents in this list must be present and must be loaded 2. Dependency: All dependents in the list are loaded, if available.

Dependency can be specified in the registry by defining two keys, along with the ImageFile and Flags for the extension:

1. StrictDependsOn: (Comma-separated symbolic names for dependency)

2. DependsOn: (Comma-separated symbolic names for dependency)

System Extension

A system extension can be used to extend the base architectural framework with new features. In this case, the client extension dependency feature is used to add feature enhancements to the base GUI framework and still maintain forward compatibility. That is, an old client connecting to a new extension using a new feature will not break. Thus, a system extension is used add new modular functionality to the base GUI. All client extensions should be implicitly dependent on the system extension, e.g., using the symbolic name of the extension "System Extension". The registry will contain the system extension version that these extensions depend upon. System extensions are denoted in the registry by a flag value (e.g., 256; other than normal, persistent and bootstrap).

There is typically one system extension entry per administration service. The system extension, in turn, can be dependent on other JAR files (client extensions) that are adding modular functionality to the base GUI. The system extension implements the IExtension interface. The IExtension interface has the following calls: init( ) shutdown( ) GetId( ); and getCapabilities( )

The system extension are typically loaded before any other extensions are loaded. That is, upon connection, first a system extension is loaded, and then bootstrapping occurs. The system extension is loaded in a class loader that is implicitly the parent loader for all extensions thus downloaded. This ensures that client extensions thus downloaded have access to the classes in the system extension.

The new client installation will thus always have within it the latest version of the system extension. The versioning check performed in an administration architecture according to the present invention ensures that the system extension with the latest version is downloaded and loaded in the given class loader.

Examples of Dependent Extensions

Figure 3B:
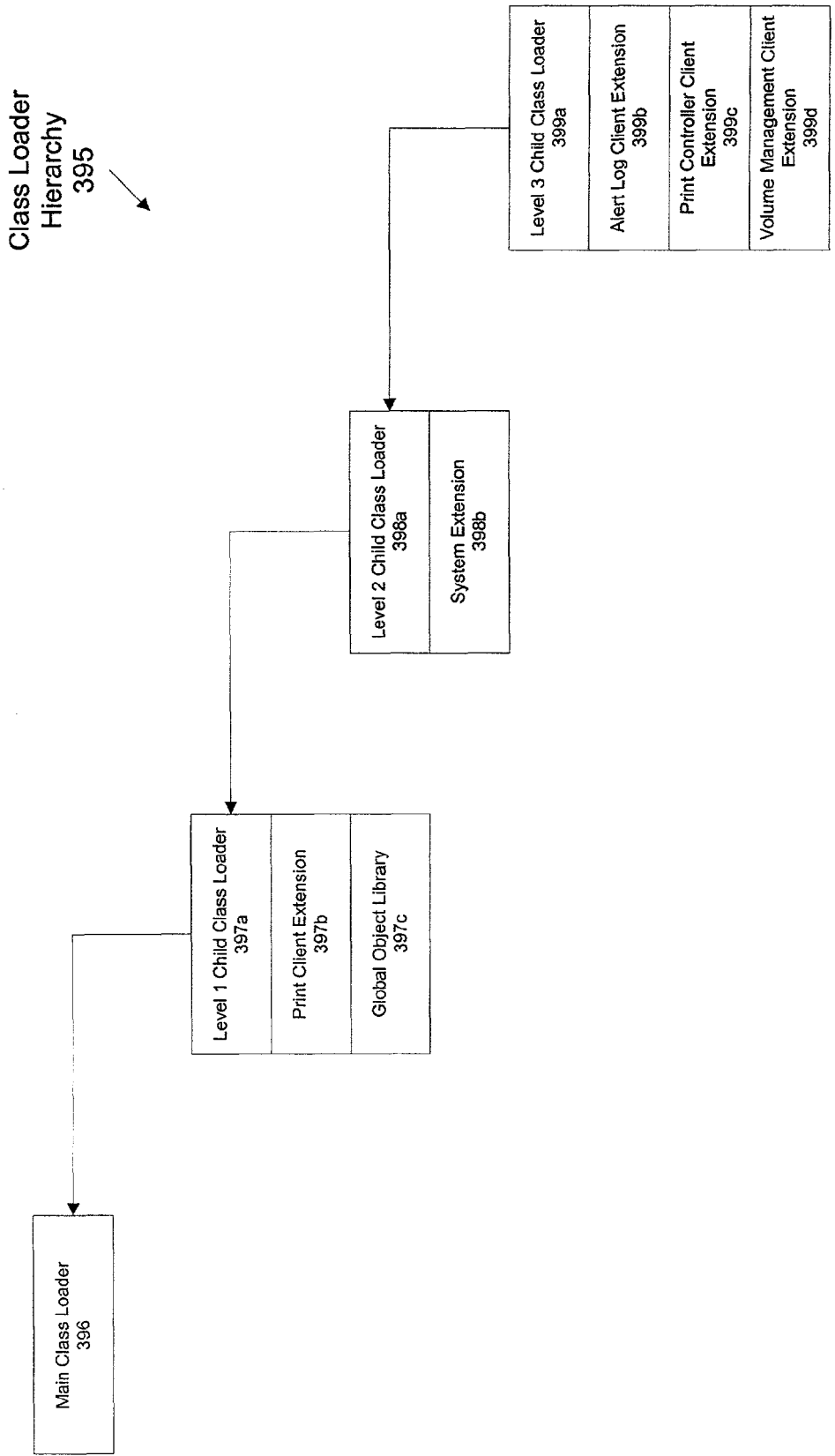
FIG. 3B is a block diagram illustrating one example of a dependency between client extensions.

FIG. 3B is a block diagram illustrating one example of a dependency between client extensions according to embodiments of the present invention, which illustrates not only dependent client extensions, but also the use of a system extension. FIG. 3B shows a class loader hierarchy 395 for a client extension. Class loader hierarchy 395 includes a main class loader 396, a level 1 child class loader 397*a*, a level 2 child class loader 398*a* and a level 3 child class loader 399*a*. As is illustrated in FIG. 3B, level 3 child class loader 399*a* depends on level 2 child class loader 398*a*; level 2 child class loader 398*a*, in turn, depends on level 1 child class loader 397*a*; and level 1 child class loader 397*a*, in turn, depends on main class loader 396. As can also be seen, level 1 child class loader 397*a* is the class loader for a print client extension 397*b* and a global object library 397*c*; level 2 child class loader 398*a* is the class loader for a system extension 398*b*; and level 3 child class loader 399*a* is the class loader for an alert log client extension 399*b*, a print controller client extension 399*c*, and a volume management client extension 399*d*. In class loader hierarchy 395, printing and global object support has been added to the base architecture via the system extension feature just described.

In another example, the bulb extension is assumed to depend on an extension named BaseBulbExtension. For the extensions to be identified by simple means, the SymbolicName field must be used. This is a StringValue for the GUID key, which is available as a value under the GUID field in the registry. The DependsOn and the StrictDependsOn fields are defined as String Values. This field is available in the registry in the form of StringValues for the locale. (This is the same level as the ImageFile and Flags.) If Bulb Extension Strict Depends On Base Bulb Extension (Load all, else none), the bulb extension has its StrictDependsOn: "BaseBulb." If Bulb Extension Depends On Base Bulb Extension (Load all, if available), the bulb extension has its DependsOn: "BaseBulb."

Packaging

The client extension is shipped across as a JAR file. All classes for the extension and other relevant files (images, HTML pages, and so forth) are packaged in the JAR file. Information about this file and all other files must be kept in the JAR in a manifest file. To package the client extension, a JAR command, which allows the creation a JAR file, and JAR command options allows many other tasks, including creating a manifest file. After the JAR command is issued, the administration client attempts to load the extension using the manifest (meta) file. If the client extension is not loaded, the administration client issues an error message in a pop-up window, then attempts to load the extension using the plain text file created by the extension.

Using the Table Widget

The vrts.ob.gui.views.table package contains the class for the table widget. The basic functionality of this view is to show the properties of the selected object's children and, in the case of leaf nodes, to show the properties of the node. It also has customization possibilities. It customizes the table column according to the ICustomize object returned by the Client Extension. The OBTableView has protected methods that can be overridden in a derived class to change what appears in the Rows and columns of the table. ApplyClient Extension is also protected and can be overridden.

Example of Table Widget

The example included in Appendix A implements a View that includes a split pane and two tables. The top table view shows the properties of the selected object itself, while the bottom table shows the properties of the children.

Advanced Use of Table Widget

If more than the above is required and more classes than the ObTableView are to be extended, then a TableFactory can be implemented. The ObTableObjectFactory provides protected methods which return new instances of the respective classes. If a person writing a framework skin extends any of the classes mentioned above, then the framework skin should extend ObTableObjectFactory and return an instance of the class that has been subclassed in the appropriate method, as well as to set this factory to the Table view used. This ensures that the OBTableView code directs calls to the subclassed objects. This code is provided included in Appendix A. The framework skin uses the Table widget, and subclasses some of the classes and therefore must implement a factory.

An Example of a Framework Skin

Administration framework 215 can be used to build GUI solutions or applications having a custom look and feel, default views, and start-up procedure. To customize administration framework 215 at the application level, the programmer employs a framework skin such as framework skin 330. Framework skin 330 is a client-side software component that plugs into administration framework 215. A framework skin is used to control the behavior of client extensions in administration framework 215 (and more specifically, in administration framework 215), and the functionality provided thereby. A framework skin can also be used to modify the look and feel of an application. An example of code that implements a framework skin is provided in Appendix A.

A framework skin allows for the customization of administration framework 215 at the application level. To write a framework skin, the ISkin interface should be implemented, or the default skin class extended. The ISkin interface customizes the application splash screen, allowing a customized splash screen that is displayed when the application starts up to be provided. The framework skin interface init( ) method sends initialization parameters. The getTitleText( ) method customizes the title text for the application. Administration framework 215 displays the default title if no title is specified. The getAboutBox( ) method customizes the About box contents of the application. Administration framework 215 displays the default About Box if nothing is specified. The getProductURL( ) method specifies the product URL for the application. This method links Help->Product pages and the help pages.

Views

GUI solutions or applications built using administration framework 215 are necessarily object-centric. To specify a view that can be used to browse objects (i.e., to allow configuration of the user interface to allow the interface to browse an object), an application's framework skin needs to return (i.e., define) an implementation of a navigational view. This view guides the operation of the GUI. A framework skin specifies a navigation view, and can provide additional views if required. In addition, the default views provided with a default framework skin are typically extensible. The navigation view should be supplied by every application's framework skin. Additional views can be supplied if necessary. Administration framework 215 should lay out these view components on the screen on behalf of the framework skin.

Toolbar, Menubar

To specify tool bar items that persist throughout the run of the application, the getToolbarItems( ) method is used. Likewise, to specify menubar items that persist throughout the run of the application, the getMenuBarItems( ) method is used. Both toolbar and menubar items are optional.

Connection, Disconnection

To get objects, an application may have to connect to a remote object container. If this is required at different points in a run of the application, the framework skin should supply a connection action. A connection action is added to the menus and the toolbar by administration framework 215. The connect action is responsible for firing connection events after a connection is made. Multiple connections can be made, and the user of the application may want to call a disconnect on a particular object container to which the application is connected. To provide the user with an interface to perform the disconnect, the application can be designed to return a disconnect action in a framework skin. This disconnect action is added to the menus and the toolbar by administration framework 215. The disconnect action is responsible for firing disconnection events.

Start up, Shut down

After framework skin initialization, administration framework 215 calls the skinStartup( ) method. The start up can be used to make initial connections to administration servers as a start-up default. Administration framework 215 calls the shutdown( ) method of the framework skin when administration framework 215 is shutting down. Preferably, the implementation disconnects from all data sources, if any, and then returns.

Framework Skins and Client Extensions

The client extensions for an application are downloaded in the context of a particular skin. The framework skin name is used to identify the framework skin for this purpose. The framework skin can be set to override the client extension by including a master extension, and described in the section following.

An Example of a Master Extension

Each framework skin can contain a master extension such as master extension 335 of FIG. 3A. Each master extension exercises final control over the client extensions working under the framework skin. The master extension is used to override the effect client extensions may have on the framework skin, such as GUI-component and view customization. For example, if several client extensions under a framework skin customize the GUI components and views in different ways, the master extension can be used to unify the customization. The master extension does this by overriding the effect of each client extension and providing its own customization, via the framework skin's use of the master extension as the final arbiter of GUI customization, as described below.

The master extension can also be used to override a client extension feature or to add a feature throughout an application. A framework skin supplies a master extension to the given administration framework by returning a master extension in the getMasterExtension( ) call of the ISkin interface. For customization, the administration framework iterates through extensions associated to an object and updates the GUI components in the order in which the client extensions are loaded. The administration framework then calls the master extension for customization after the administration framework has called all other extensions. The master extension overrides all other client extension customizations. When the framework includes a policy to stop iterating through the list of client extensions for updates after a particular update is made, the administration framework stops iterating and calls the same customization on the master extension. For icons, for example, the administration framework iterates through all the extensions to get an icon for the object. The administration framework stops iterating if the icon is set to be "not overridable." In this case, the administration framework does not iterate through any other extension; the administration framework only asks the master extension if the icon should be overridden. If an object has no provider-related extensions, the master extension is called, guaranteeing customization by the master extension. A master extension such as master extension 335 performs the following kinds of customizations:

1. Overrides Client Extensions under the Framework Skin
2. Adds Application-wide features through a Master Extension
3. Adds system and task property pages
4. Provides icons for hosts and tasks
5. Provides menu bar and toolbar items for hosts on client-side group node items Framework Skin and Client Extension Interaction The framework skin and the client extensions interact with the underlying data source to perform the following activities:
  Get objects for a given type.
  Get objects for given IDs.
  Access the properties of an object.
  Access the relationship between an object with other objects.
  Use provider and type objects.

Execute operations on the objects.

Register for required events and receive notification.

In administration server 400, the data source is called the client infrastructure (e.g., client infrastructure 220). Client infrastructure 220 provides services to its users. Typical users of client infrastructure 220 include client extensions. The services provided by client infrastructure 220 are exposed to the client extensions, which are downloaded from the administration server and the framework skins. To interact with the administration server through client infrastructure 220, client extensions and skins perform the following tasks:

1. Implement an interface IDatabaseListener (employed because client infrastructure 220 assumes that its users are database listeners).
2. Get a container component for a particular server. A container component represents the client-side cache for objects fetched from the administration server. The container allows client extension components to get objects for a given type or Ds, download extensions, and register required events. Client infrastructure 220 maintains a separate container for each administration server. A container component is encapsulated under one interface in client infrastructure 220, IContainer.
3. Get objects. Objects are exposed as an IData interface in client infrastructure 220. The IData interface allows client extension components to access the object properties and execute operations, as well as allowing the components to access object relationships with other objects.
4. Understand object properties. Properties (attributes) are exposed through two classes: Property and PropertySet. Property represents a single attribute of an object. PropertySet is a collection of property objects; each property can contain, for example, a type, a name, a flag, and a value.
5. Execute operations. The Data interface exposes an API to execute an operation.
6. Register for events and receive notifications. The IContainer interface allows client extension components and skins to register for required events, and the IDatabaseListener interface provides them with a way to receive notifications.
7. Handle Client-Side Group Nodes. A client-side group node represents a logical collection of objects fetched from the server.
8. Correctly interpret error generated by client infrastructure 220.
9. Know other miscellaneous components (e.g., Java Packages and Components)

An Example Administration Server

Figure 4:
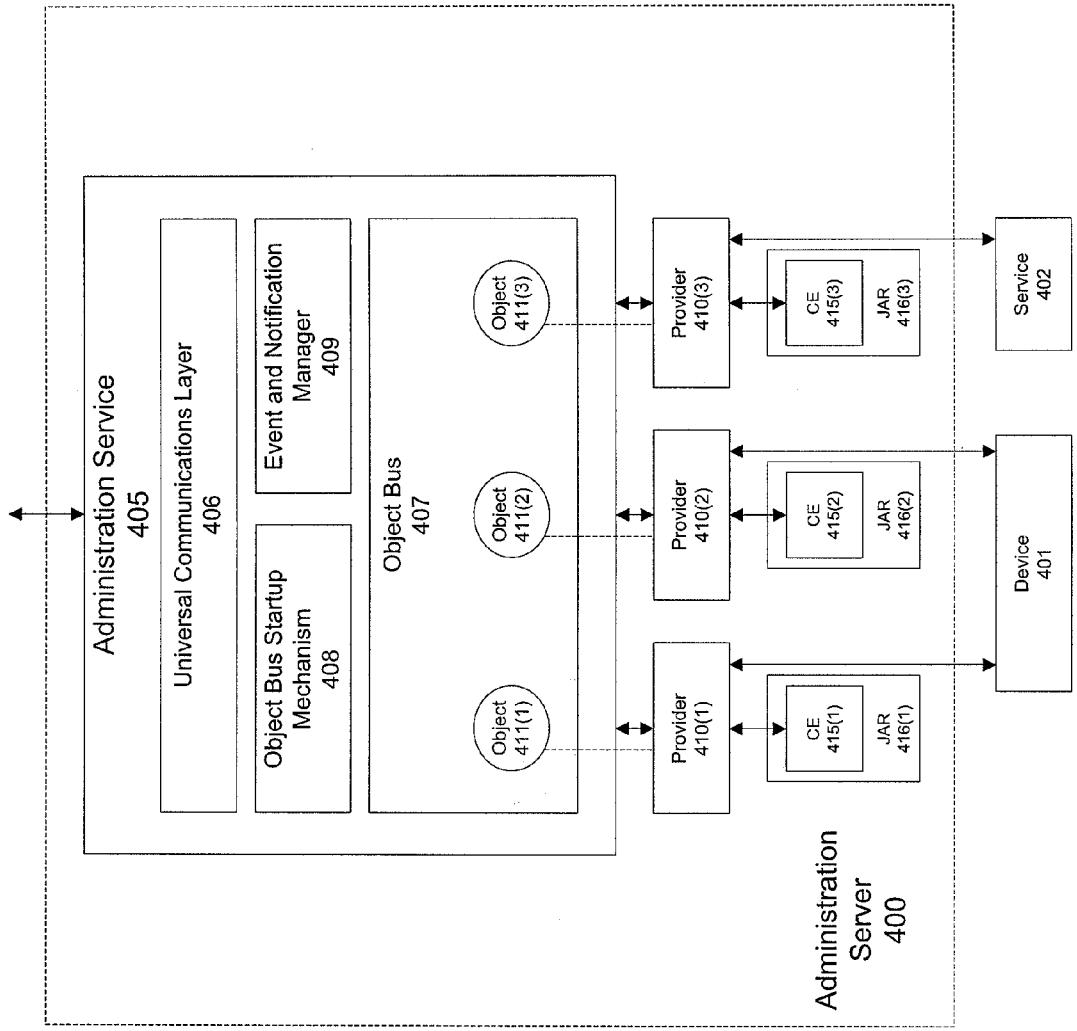
FIG. 4 is a block diagram illustrating an administration server in more detail.

FIG. 4 is a block diagram illustrating an administration server 400, which is an example of one of administration servers 120(1)-(N), shown in greater detail. As depicted in FIG. 1, an administration server typically has under its management one or more entities (exemplified in FIG. 1 by entities 140(1,1)-(N,N)), which may be hardware, software, or other digitally-controllable items. Such entities are depicted in FIG. 4 by a device 401 and a service 402. Included in administration server 400, and an example of one of administration services 230(1)-(N), is an administration service 405. Administration service 405 is available to a number of providers (depicted in FIG. 4 as providers 410(1)-(3)). Administration service 405 includes a universal communications layer 406 which allows communications with the client infrastructure of one or more administration clients. Administration service 405 also includes an object bus 407 which is initialized by an object bus start-up mechanism 408. Also included in administration service 405 is an event and notification manager 409, the operation of which is described connection with the discussion of the internal operation of an administration service such as administration service 405.

Providers 410(1)-(3) create objects on object bus 407 that represent the entities under management (e.g., device 401 and service 402, among other possibilities), which are depicted in FIG. 4 as objects 411(1)-(3). Thus, in administration architecture 100, entities such as device 401 and service 402 are managed via their respective objects (here, objects 411(1)-(3)). It will be noted that a given entity can be managed by more than one provider, as is the case with device 401.

In order to support the management of such entities by an administration client such as administration client 210, providers 410(1)-(3) have access to, respectively, client extensions 415(1)-(3). Client extension 415 (1)-(3) contain information that allows administration client 210 to manage device 401 and service 402 via objects 411(1) and 411(2), and object 411(3), respectively. To support access to such information, client extensions 415(1)-(3) can be archived into, for example, Java Archive files (depicted in FIG. 4 as JAR files 416(1)-(3), respectively). Having been archived in JAR files 416(1)-(3), client extensions 415(1)-(3), can be transported via administration service 405 and communications module 345 of client infrastructure 220, to client cache 225 within OM layer 340 of the administration client 210. In this manner, client extensions 415(1)-(3) can be made available to administration framework 215 (and in particular GUI infrastructure 300) and so allow administration framework 315 to control device 401 and service 402 via their respective objects (objects 411(1)-(3)), as maintained on object bus 407.

Figure 5:
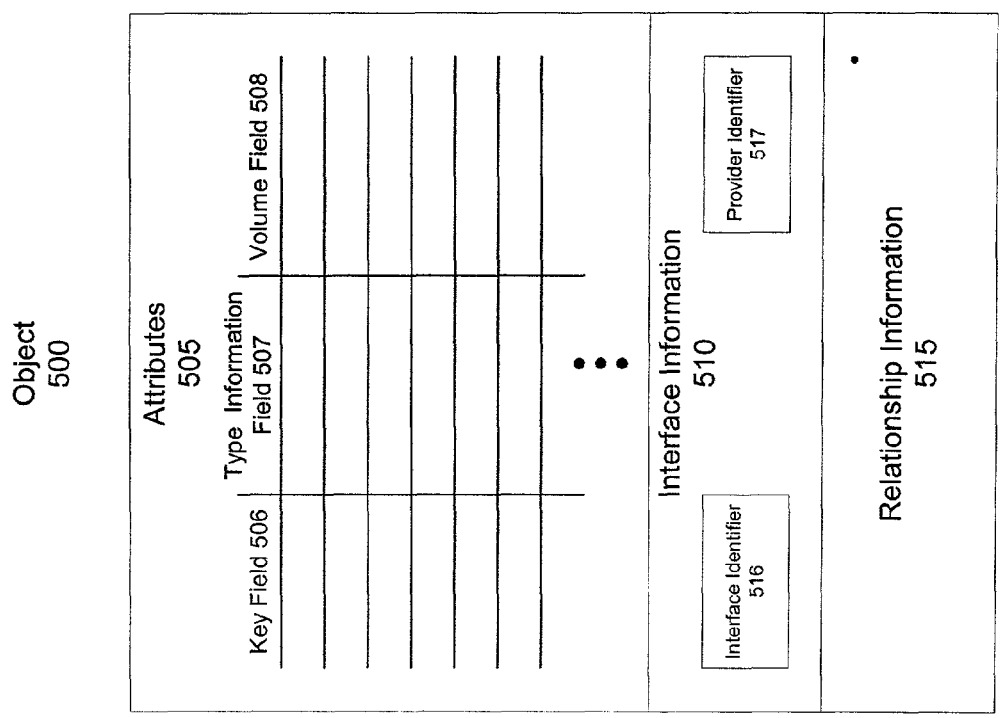
FIG. 5 is a diagram illustrating an example of an object.

FIG. 5 is a diagram illustrating an example of an object 500 and its contents, such as objects 411(1)-(3) of FIG. 4. In one embodiment, the objects maintained on object bus 407 (e.g., object 500) contain the following information:

1. Attributes 505 (also referred to herein as properties, and which can include, for example, a key (an object identifier; held in key field 506), a data type (held in type information field 507), and other information (e.g., a volume information field 508 (containing, e.g., a value and one or more flags))
2. Interface information 510 (e.g., a collection of methods, which implement the action that can be taken on the object); and
3. Relationship information 515 (i.e., relationships between the object in question and other objects (e.g., parent and child associations)).

Interface information 510 is a tuple that, in one embodiment, consists of the following information:

1. An interface identifier 516, which is a global unique identifier (GUID) that denotes a contract; and
2. A provider identifier 517, which is the identifier of the provider that added the interface on the given object.

The services provided by an administration service such as administration service 400 is now described. The operation of object bus 407 is then subsequently described in greater detail.

Services Provided by an Administration Service

Formalization

Administration service allows object types to be formalized. A provider defines the type of an object before the provider creates an instance of that type. A type is defined by a name (identification), attributes (properties), interfaces (behavior), and the types the given type derives from (inheritance). Type names are strings such as "disk," "volume," and so on. In one embodiment, type names may contain any letter of the alphabet, underscores, and colons (:), and are case-sensitive.

Object Manipulation

The provider represents a manageable entity for different resources, such as a storage device or a storage area network (SAN) switch device. This entity represents the features and functionality of the resources and executes resource operations. The entity stores the features and functionality of the resources as objects in the framework. The framework offers application program interfaces (APIs) that enable the provider to perform many tasks, including:

- creating and deleting objects
- obtaining and setting properties of objects
- maintaining a hierarchy of objects Memory Management The framework provides a memory management API, which allows providers to allocate and free required memory chunks. This API also enables providers to trace the allocated and freed chunks in the memory pool.

Event Notification

A provider enables clients to execute the operations on the entity (e.g., the storage device), which can lead to object creation, deletion, or modification, for example. The event notification mechanism informs other providers, and clients, of these operations. The event notification mechanism also provides information on hardware device configuration changes and hardware failures. Certain events are typically predefined administration server 400. Providers can also define additional events. Providers register for these events, and are notified when the events occur. Predefined events in one embodiment of administration server 400 include:

- object created
- object deleted
- object properties changed
- object parent-child relationship changed
- object provider interface list modified An event manager (e.g., event manager 355 of FIG. 3A) maintains a list of providers registered for various events. When administration server 400 generates an event, administration server 400 interfaces with event manager 355 to notify registered providers. Event manager 355 also enables providers to wait for an event to occur by using wait criteria functions and time outs.

The provider waits for an event to be generated until one of the following occurs:

- The wait criteria function executes and returns true.
- The wait criteria function times out after it does not return true within the specified interval.

Alerts

The alert service within administration architecture 100 enables a provider to register and raise alerts. Alerts are conditions that require the user to take action. For example, a disk failure can be an alert condition. An alert typically consists of an alert topic, a message, a description, and a recommended action. Because an alert is displayed to the user, most of the fields of an alert are typically in a format that is a simple internationalized string.

Registering and Raising an Alert

Providers register alerts directly in administration service 400. Also, an alert must be published before it can be used. When an alert condition occurs, the provider raises the alert via administration service 400. This causes the alert message to be logged according to the locale, using the message catalog of the provider.

Task Management

Administration clients can initiate tasks that are inherently asynchronous, such as the formatting of a partition. When an administration client requests the administration server to perform such tasks, the administration server either:

- Returns to the caller after the task is initiated, or
- Initiates an asynchronous task.

When administration server 400 performs an asynchronous task, administration server 400 must notify all the clients connected to administration server 400 regarding the status of the task, at periodic intervals. Each task is represented in administration server 400 (and specifically, on object bus 407) as a task object. The developer of a provider can cause a task, or a subtask of the task, to be created, by setting the former object as the parent of the latter object. Operations can be invoked on a task object. A task interface enables providers to setup and inform their clients about the status of the task. Clients can track progress of a task by monitoring task object and checking its percent complete property. Providers can enhance and enrich basic task object to provide for provider-specific task attributes to the interested clients.

Internal Operation of an Administration Service

In one embodiment of the present invention, administration service 405 includes three primary components:

1. Networking (including universal communications layer 406, which can be used to allow a given administration service to communicate with other administration services on other administration servers (i.e., inter-administration server communications), as well as to communicate with various administration clients)
2. Object manager (as part of object bus 407)
3. Event and notification manager 409

The operation of administration service 405 proceeds as follows. When administration service 405 starts, administration service 405 reads a registry (described subsequently) and loads the requisite providers, one-by-one. The order of loading is typically controlled by the information contained in the registry. In one embodiment, each provider supports the following functions:

1. Initialize
2. ChangeNotify
3. Control
4. Shutdown

When a provider is loaded, administration framework 100 calls an initialize function. During this initialize function, the provider creates objects based on the entities that the provider is to manage. As noted previously, an object is an abstract representation of a physical or logical entity that is to be managed by the given provider.

As part of creation of an object, the provider adds relationships with other objects and also adds interfaces that represent contracts on the object. To explain further, an object called "Bulb" (as further defined elsewhere herein) can be considered. Such an object can have a child relationship with another object called "Filament". This, for the provider that created the relationship, may mean that a "Filament" is contained in a "Bulb", for example.

The provider can add interfaces (in this example, a "Bulb_Interface"). This is a contract, which means that this object (which, incidentally, represents a bulb) supports the methods that are required by the "Bulb_Interface". These methods can be, for example, "Switch off a bulb" and "Switch on a bulb".

In other words, certain functions are provided by a provider and it is those functions that are expressed using interfaces. In administration service 405, providers can add interfaces on any object, regardless of whether that provider created the object or not. This unprecedented flexibility allows for modular development. For example, the following example can be posited. A "Disk Object" exists that is created by a "Disk Provider". A "Backup Provider" later can choose to add a "Backup Interface" on the "Disk Object", thereby providing backup functionality to the disk.

Functionality Provided by an Administration Service

Typically, the main functionality provided by an administration service such as administration service 405 includes:

1. Object management (i.e., the support of a repository (e.g., client cache 225) for the efficient lookup and manipulation of objects, their attributes, relationships and interfaces);
2. A notification management subsystem; and
3. A networking layer which is preferably a pluggable subsystem to administration service 405.

In addition to the above core functionality, administration service 405 can provide call dispatching. Subsequently, the process by which a call originating in administration framework 215 finds its way to the correct provider. As an example to assist in the understanding of this functionality, one object ("Disk"), having two interfaces ("Disk Interface" and "Backup Interface"), is assumed. In this example, disk interface and the disk object were created by the disk provider, while the backup interface was added by the backup provider.

In certain embodiments, as noted elsewhere herein, there is a one-to-one mapping between a provider and a client extension. The disk object O1 can be referred to as, for example, the disk interface (or I(d)) and the backup interface as I(b). The disk provider can be denoted P(d), and backup provider denoted P(b). The extension of P(d) is E(d) and the extension of P(b) is E(b).

When a disk object is shown in administration framework 215, the extensions E(b) and E(d) co-operate to render the disk object. Extension E(b) adds the menu items corresponding to "backup" and extension E(d) adds the menu items corresponding to "disk".

For purposes of the present example, it is assumed that there is a single method supported in I(d) called "Format", and a single method in I(b) called "Backup". This implies that E(d) will add the menu-item "Format" and E(b) will add "Backup". When a user selects the "Backup" control, administration framework 215 goes into E(b). E(b) then causes the wizards/dialog boxes required for the backup operation to be "popped-up", and so gathers the required input data from the user. E(b) then makes a call into the client infrastructure (CI) layer. The client infrastructure layer (i.e., client infrastructure 220) provides a client-side cache (client cache 225). Client infrastructure 220 is typically written in an object-oriented language such as Java and/or C++. The call into client infrastructure 220 is made by making the following request: "Perform operation "Backup" on object O1 on interface I(b) with parameters P". Client infrastructure 220 routes this call to administration server 400. Administration server 400 looks up O1 and then looks up I(b). Using the interface information in O1 (e.g., interface information 510 of FIG. 5), administration server 400 finds that P(b) added the interface (I(b)). Administration server 400 then routes the call to P(b), through a P(b)-supplied control function.

The preceding represents an example of how requests from administration framework 215 are promulgated to a provider via administration service 405. However, in a similar fashion, a provider is capable of communicating with other providers. In other words, a provider can perform an operation on a object via one of its interfaces, using a method and parameters, and administration service 405 will automatically route the call to the provider that added the interface. In certain embodiments of the present invention, a provider can also explicitly call another provider (e.g., by name) using an application programming interface call (e.g., a PrCallProvider call to the API). In that case, administration service 405 routes the call to the named provider directly. The preceding thus explains the manner in which call routing/dispatching operates in various scenarios when using an architecture according to embodiments of the present invention.

As noted, in embodiments of the present invention, administration architecture 100 is includes an administration server, and an administration client that includes an administration framework and client infrastructure layer (which can be thought of as a client-side cache manager). As also noted, client infrastructure 220 maintains a cache of the objects maintained in the administration server. The cache is kept up-to-date using a notification mechanism. This notification mechanism includes event manager 355, on the administration client side, and event and notification manager 409, on the administration server side (as depicted in FIGS. 3 and 4, respectively). An explanation of the notification mechanism's operation is now provided as to the manner in which notifications and events operate in administration architecture 100.

In one embodiment of the present invention, notifications can be of two types:

1. Object notifications
2. Events/Alerts

Object notifications are generated automatically if a state of an object changes in the object bus of administration service 405. This state can indicate, for example, a change of attributes, relations, or interfaces. Providers can register for notifications, and notifications can be registered with varying granularity. For example, a provider can register for all changes to:

1. A type of object,
2. A specific object, or
3. A relations change on a class or specific object.

As will be apparent to one of skill in the art, other levels of granularity can be made available as alternatives.

Notifications are delivered to a provider through a provider-supplied function (e.g., a "ChangeNotify" function). Notifications provide a mechanism for providers to co-operate and keep objects that they manage synchronized. For example, the state of a filesystem object managed by "Filesystem Provider" may depend on the state of a volume object which is managed by "Volume Provider". In addition to object notifications, events defined by providers can cause notifications and there can be other providers that listen for those events (i.e., administration clients that can watch for those events). Events can be defined in a variety of ways. For example, an event can be defined based on a given a topic. Such an event can be of the form event.<company_name>.<x><y>..., where company_name is the name of the company that produces the given provider. To register for all events, a provider or client registers for "event". For registering for all events based on a given criteria, a provider or client registers using "event.criteria".

An event is an object that gets logged into a file to represent some thing that happened that should be recorded for future reference. Events are categorized as information, warnings, or errors. Events do not change once created. Each type of event is uniquely identified by a GUID. Providers can raise events and/or register for them. When an event occurs, whether it is raised by a user or by the administration server in response to changes in the database, it is broadcast to all providers registered for it and to all clients. Events can be filtered into other subsystems, such as the NT event log or the Unix messages log. When an event mechanism is defined, it allows greater flexibility and also extends platform independence, which is not otherwise possible. Events that occur as a result of changes in the administration server database are different from change notifications. Change notifications are used only to maintain remote caches synchronized with the administration server database. Events notify registered providers of changes that occur in the administration server database, and alert providers to take action, if necessary. Events generated for this purpose do not contain the complete details that appear in change notifications.

An Example of a Provider

As noted, a provider is an entity that uses an administration service to create, store and manage data objects and allows operations to be performed on these objects. Typical services offered by a provider include:
1. Device management
2. Policy and alert management
3. Data repository A provider is responsible for synchronizing objects with the entities they represent. The provider modifies the objects whenever a change on the source entity occurs. This update triggers a set of events that signal interested clients and other providers. The trigger occurs regardless of whether the resource change is caused by a command from the client or by an asynchronous event.

A provider can be implemented as a dynamic link library (DLL) or shared library with a single entry point. The entry point, ProviderEntry, initializes a caller-supplied structure with the addresses of the provider API routines implemented for a specified provider. For example code for a provider, please refer to Appendix A.

Steps for Writing a Provider
1. Formalize Objects
2. Create Objects
3. Maintain Objects
4. Implement an Interface on an Object
5. Raise Events
6. Publish and Raise Alerts
7. Create Task Objects
8. Modify the Registry Defining Objects As noted, objects represent the attributes of, and the operations that may be performed on an entity. The first step in developing a provider is to identify the required objects and their relationships need to be generated. These objects are the actual manageable entities in the provider, and the objects represent the attributes of the entity the provider is managing. The following steps describe how to define objects for a provider:
1. Define the object type.
    Providers must define the type of an object before they create an instance of that type. A type is defined by a name (identification), properties (attributes), interfaces (behavior), and the types it derives from (inheritance).
2. Define the object attributes.
    An object can have various attributes, which describe its features. An attribute is represented as key-value pair, where key is name of the attribute.
3. Define object relationships.
    The framework allows parent-child relationships as displayed by an appropriate graphical user interface (GUI) with a tree view. The provider is responsible for establishing the required relationship between the created objects.
4. Define various operations.
    An operation refers to an action that can be performed on an object. An administration service typically expects a set of operations to be a part of an interface. An operation is a combination of major code, minor code, and operation-specific parameters. The major and minor codes define the opcode of the operation. The following conventions are used to define an opcode:
        Major code identifies object type
        Minor code identifies object operation Administration server 400 supports synchronous and asynchronous operations. Every operation can involve changes in several objects in the database of administration server 400. Providers should ensure that consistency is maintained in the framework database while performing synchronous and asynchronous operations.

The provider API includes an entry point routine, ProviderEntry, that initializes a caller-supplied structure with the addresses of the provider API routines implemented for a specified provider.

Writing a ProviderEntry Interface

This ProviderEntry function provides the administration server with a list of pointers to the API interface routines. Providers export the ProviderEntry function. Code for this function appears in Appendix A.

Interfacing to Other Providers

Multiple providers can manage a single object, as is depicted in FIG. 4. This management is made possible by a provider interface. Any provider interested in controlling an object must add an interface on that object or on the type of the object. A control operation can include three parameters:
1. Major code
2. Minor code Interface
3. Global unique identifier (GUID)

A control operation is diverted to the appropriate provider using these three parameters. If an interface GUID is available, a provider using this GUID is located and the call is diverted to that provider, which interprets the major and minor code. Any provider can execute an operation on any interface that is registered on the object or on the type of the object. The interface GUID helps identify the provider of the control operation. The following steps describe how to support explicit calling.
1. Define a function to perform the operation. In the control function of the provider, a combination of major and minor codes route the call to this function.
2. Define the required macros and hash defines in a local header file. The required definitions include major opcode (object type) and minor opcode.
3. Define an interface GUID for this provider. The same GUID can be used for all the objects. (An object cannot use the same interface GUID twice, but the same GUID can be used across multiple objects.) All providers must use the same interface GUID for operations that perform similar tasks. For example, if an interface GUID is defined for the format operation, the array provider and the disk provider use this interface GUID to perform the formatting operations on the respective devices. Providers must not use the same GUID for operations of varying nature.
4. Initialize the provider. The initialize function indicates the objects that the provider desires to support this operation. The interface GUID is then added to each object.

Implementing the Provider API

The provider must export a set of functions to communicate with administration server 400. The APIs enable the framework to load the provider, pass commands to be executed on the hardware, send notifications, and perform miscellaneous tasks. The provider-exported functions are described in Appendix A.

Example Provider Code

An example of code that can be used to implement a provider is given in Appendix A, and includes the modules dllmain.c, bulb.h, bulb.c and bulbalert.c.

Administration Server Services Used by Providers

Object Manipulation

There are three object manipulation services:
1. object creation and deletion service, which enables a provider to create and delete objects to represent the current state of the entity being managed.
2. property management service, which enables a provider to access and modify the properties of an object.
3. object hierarchy management service, which enables a provider to traverse and change the object hierarchy of the objects it represents.

Memory Management

The memory management service enables a provider to efficiently allocate and/or deallocate memory chunks.

Event Management

The event management service enables a provider to receive event notifications generated by the framework or other providers. The event management service of the framework contains APIs for the following functions:
1. Registration: a provider registers for events of interest, entering the GUID of each event. The provider can later unregister the events for which it is registered.
2. Callback: A provider can receive event notifications, which occur when an event for which the provider is registered occurs.
3. Raising Event: A provider typically raises an event, but events are also raised by administration server 400 for changes to the database, such as object creation, object deletion, parent-child relationship changes, and property modifications.
4. Waiting for Event: A provider can wait for events on a one-time basis. When the event occurs, the provider is signaled.

Registering a Provider

Figure 6:
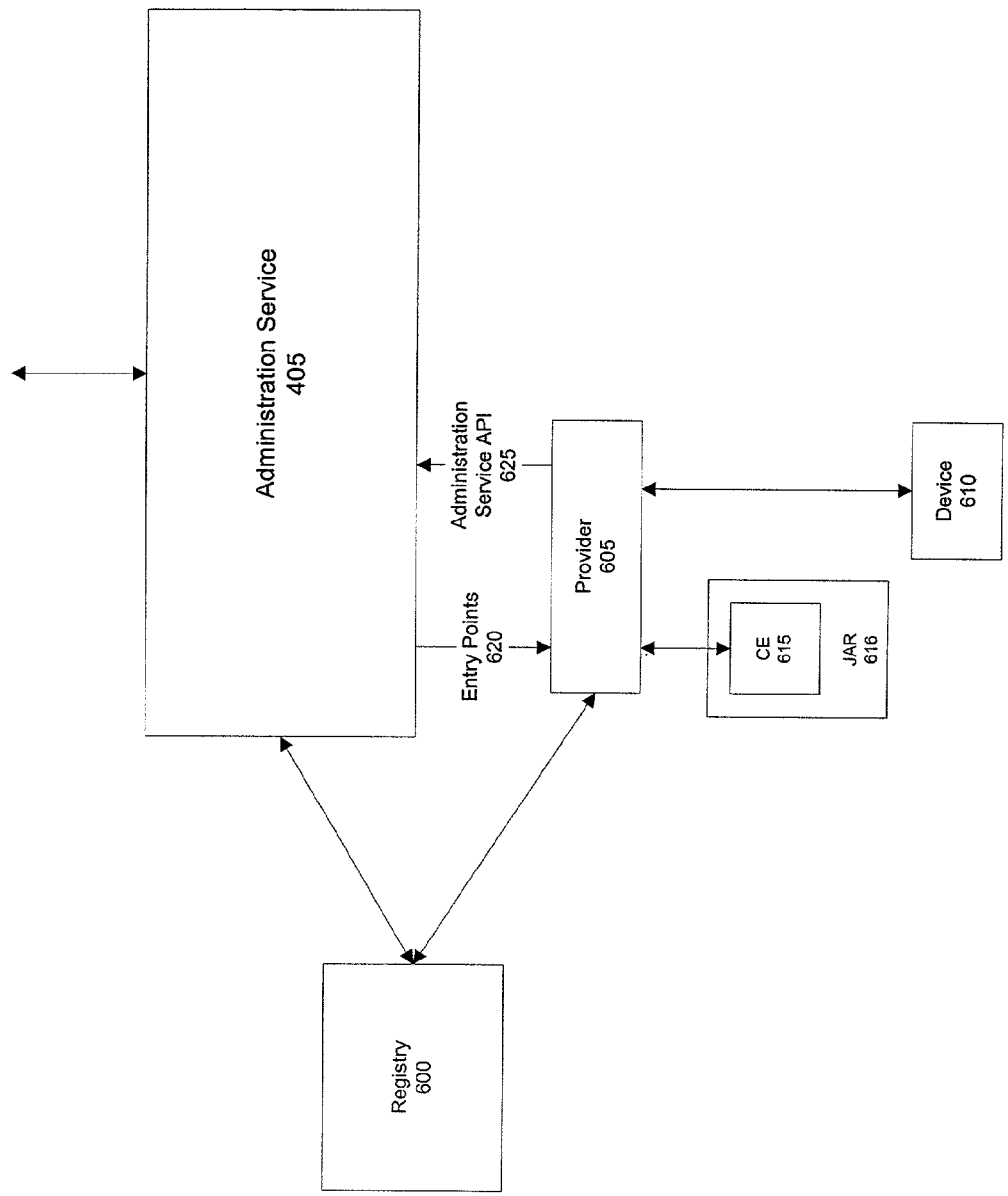
FIG. 6 is a block diagram illustrating the interaction of an administration server and a provider with a registry.

FIG. 6 is a block diagram illustrating an example of implementation of a registry 600 and its relationships with administration service 210 and provider 605 (which is merely exemplary of the providers described herein (e.g., providers 235 (1,1)-(N,N)). In a similar fashion, provider 605 can be used to manage, for example, a device 610. A client extension 615 (as part of a JAR file 616) provides the information required to manage device 610. As noted previously, administration service 210 communicates with provider 605 via calls to the provider (via entry points 620). Similarly, provider 605 communicates with administration service 210 via an API of administration service 210 (e.g., an administration service API 625).

After implementing the provider API functions and ProviderEntry function (represented by entry points 620), provider 605 is installed so administration service 210 is able to load provider 605 and so maintain the devices that provider 605 manages. To install provider 605, the installer copies the dynamically linked library of provider 605 to an appropriate location and creates the provider registry information in registry 600. The following section describes the information used to register a provider.

Provider Registry Keys

Initialization and configuration parameters for providers are contained in the subkeys under the following registry path:

HKEY_LOCAL_MACHINE\Software\VERITAS\ VxSvc\CurrentVersion\Providers\<ProviderName>\ "MessageCatalog"=<CatalogId>

The name of each provider subkey is the name of the provider, which is also the default file from which the provider is loaded. Each provider subkey can have additional subkeys to store the information particular to the provider, such as configuration values.

Providers can define their own provider-specific error codes. To do this, providers must define a message catalog file, in which error codes are defined. The message catalog file is typically built as a Java resource and sent to the client when the client requests it. The Java resource file can be constructed from the message catalog file using a perl script. When the provider returns a provider-specific error code, the client obtains the appropriate message from the message catalog and displays that message to the user. This approach facilitates internationalization of the error messages.

Customizing the Provider Registry

On certain systems, the registry manipulation routines are exposed. During provider installation, the installation program creates entries in the registry. This creates entries for creating a key, setting values for keys, deleting values for keys, querying values for keys, deleting keys, and so on. Additionally, providers can store their own information in the registry. Various methods are typically available to access the information stored in the registry, depending on the operating system employed.

An Example GUI Layout

Figure 7:
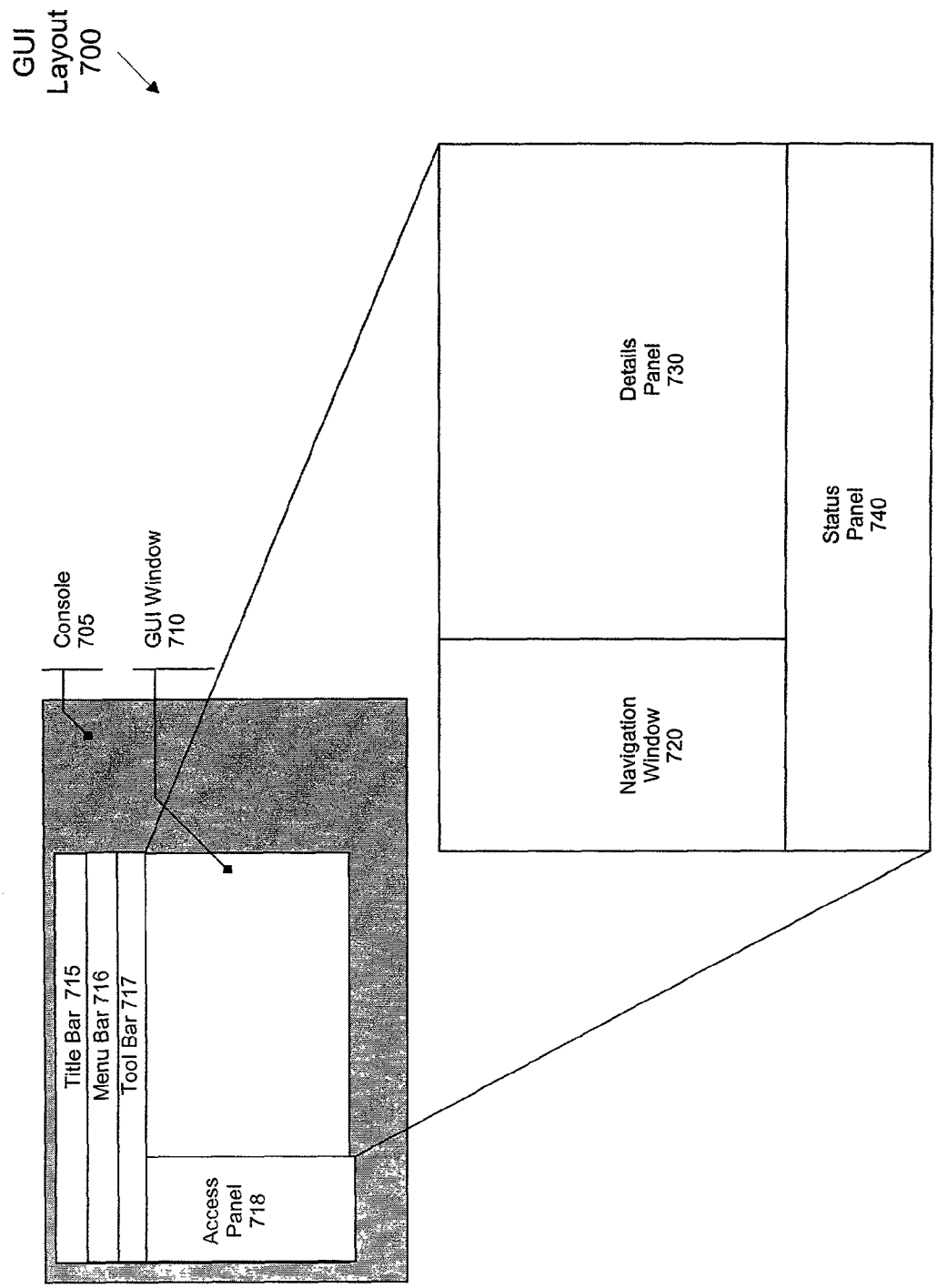
FIG. 7 is a diagram illustrating an example of a graphical user interface (GUI) generated by an administration architecture such as that depicted in FIG. 1.

FIG. 7 is a diagram that illustrates an example of a GUI layout 700 generated by administration framework 215, which presents a user with a interface to the information provided by administration architecture 100. GUI layout 700 includes a console 705, which further includes a GUI window 710. Console 705 also provides ancillary information in other areas of its display, examples of which are depicted in FIG. 7 as a title bar 715, a menu bar 716, a tool bar 717 and an access panel 718. GUI window 710, in turn, includes a navigation window 720, a details panel 730, and a status panel 740. Navigation window 720 allows for the display and representation of the entities under management in a manner that is intuitive and logical, based on the characteristics of the entities under management, and is referred to in conjunction with views as a navigation view. Navigation window 720 presents information such as the "Tree View" described previously. Details panel 730 allows for presentation of information regarding one or more of these entities in a manner appropriate to the type of entity under management and currently selected, and is referred to in conjunction with views as a detail view. Details panel 730 presents information such as the "Table View" described previously. Similarly, status panel 740 allows for the presentation of information regarding one or more of the given entities in a manner appropriate to those entities, and is referred to in conjunction with views as a status view. Status panel 740 presents information such as the "Properties View" described previously.

An Example Computing and Network Environment

Figure 8:
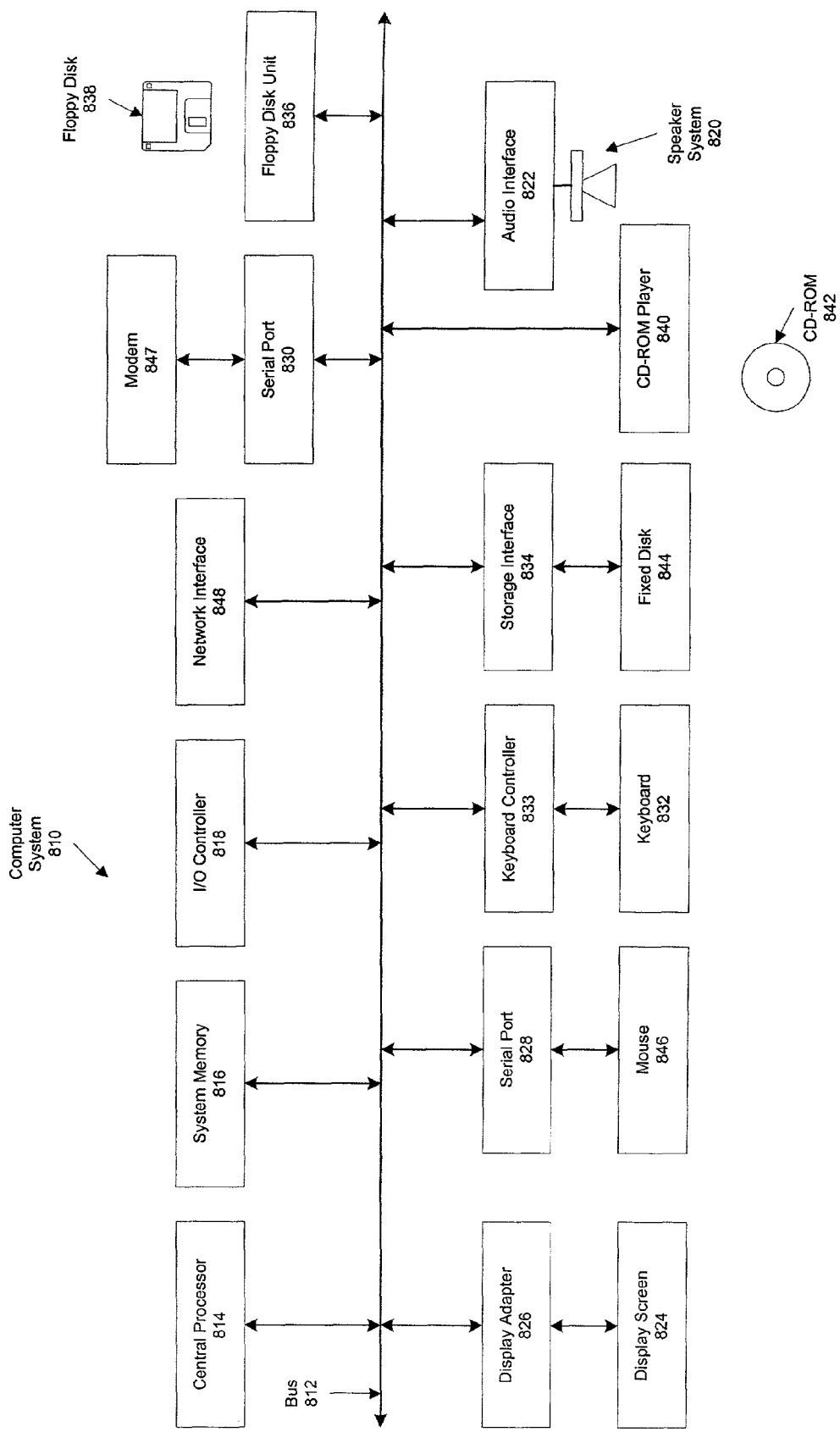
FIG. 8 is a block diagram illustrating a computer system suitable for implementing embodiments of the present invention.

FIG. 8 depicts a block diagram of a computer system 810 suitable for implementing the present invention. Computer system 810 includes a bus 812 which interconnects major subsystems of computer system 810 such as a central processor 814, a system memory 816 (typically RAM, but which may also include ROM, flash RAM, or the like), an input/output controller 818, an external audio device such as a speaker system 820 via an audio output interface 822, an external device such as a display screen 824 via display adapter 826, serial ports 828 and 830, a keyboard 832 (interfaced with a keyboard controller 833), a storage interface 834, a floppy disk drive 836 operative to receive a floppy disk 838, and a CD-ROM drive 840 operative to receive a CD-ROM 842. Also included are a mouse 846 (or other point-and-click device, coupled to bus 812 via serial port 828), a modem 847

(coupled to bus 812 via serial port 830) and a network interface 848 (coupled directly to bus 812).

Bus 812 allows data communication between central processor 814 and system memory 816, which may include both read only memory (ROM) or flash memory (neither shown), and random access memory (RAM) (not shown), as previously noted. The RAM is generally the main memory into which the operating system and application programs are loaded and typically affords at least 16 megabytes of memory space. The ROM or flash memory may contain, among other code, the Basic Input-Output system (BIOS) which controls basic hardware operation such as the interaction with peripheral components. Applications resident with computer system 810 are generally stored on and accessed via a computer readable medium, such as a hard disk drive (e.g., fixed disk 844), an optical drive (e.g., CD-ROM drive 840), floppy disk unit 836 or other storage medium. Additionally, applications may be in the form of electronic signals modulated in accordance with the application and data communication technology when accessed via network modem 847 or interface 848.

Storage interface 834, as with the other storage interfaces of computer system 810, may connect to a standard computer readable medium for storage and/or retrieval of information, such as a fixed disk drive 844. Fixed disk drive 844 may be a part of computer system 810 or may be separate and accessed through other interface systems. Many other devices can be connected such as a mouse 846 connected to bus 812 via serial port 828, a modem 847 connected to bus 812 via serial port 830 and a network interface 848 connected directly to bus 812. Modem 847 may provide a direct connection to a remote server via a telephone link or to the Internet via an interne service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 8 to be present to practice the present invention. The devices and subsystems may be interconnected in different ways from that shown in FIG. 8. The operation of a computer system such as that shown in FIG. 8 is readily known in the art and is not discussed in detail in this application. Code to implement the present invention may be stored in computer-readable storage media such as one or more of system memory 816, fixed disk 844, CD-ROM 842, or floppy disk 838. Additionally, computer system 810 may be any kind of computing device, and so includes personal data assistants (PDAs), network appliance, X-window terminal or other such computing device. The operating system provided on computer system 810 may be MS-DOS®, MS-WINDOWS®, OS/2®, UNIX®, Linux® or other known operating system. Computer system 810 also supports a number of Internet access tools, including, for example, an HTTP-compliant web browser having a JavaScript interpreter, such as Netscape Navigator® 9.0, Microsoft Explorer® 9.0 and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 810). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Figure 9:
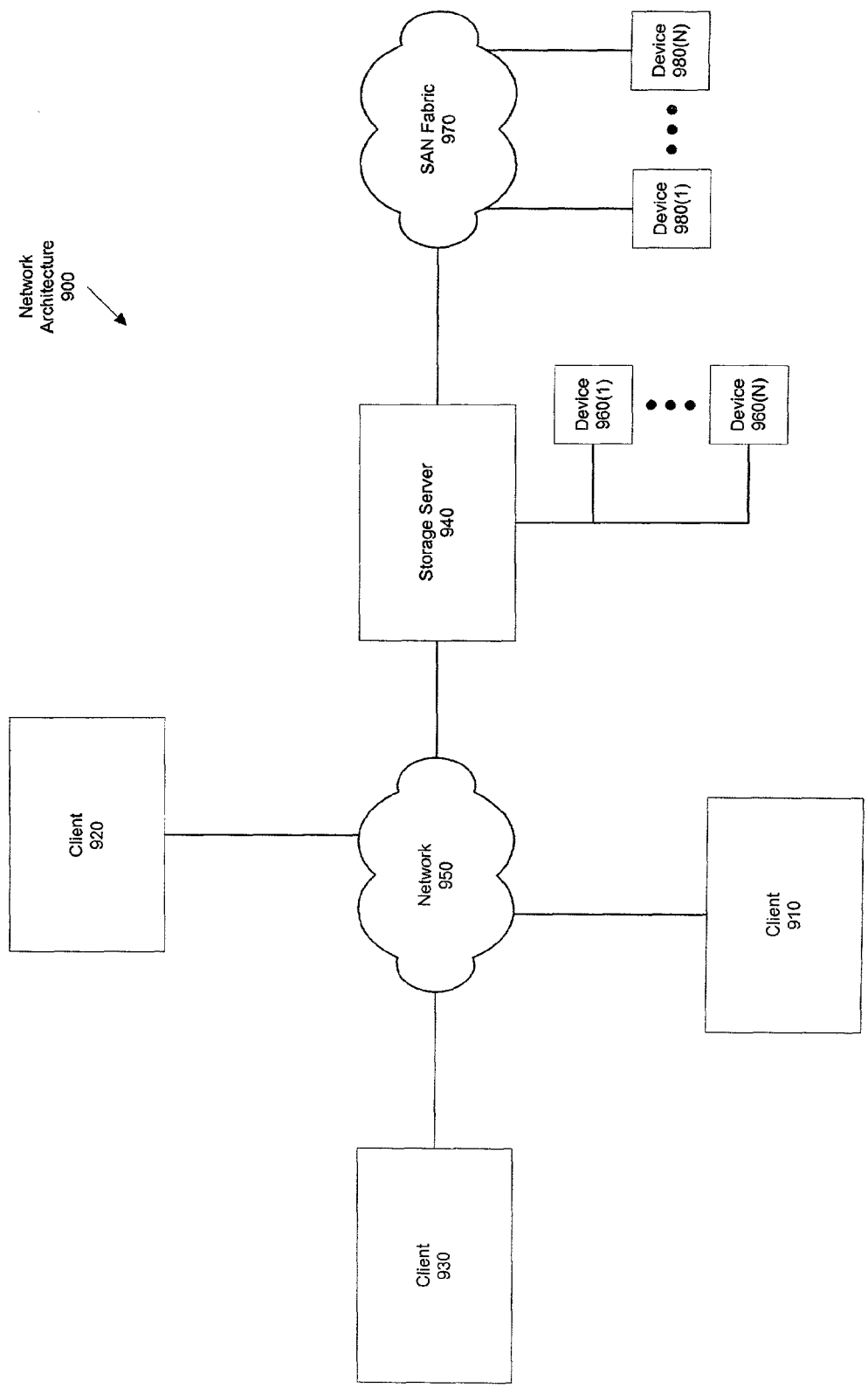
FIG. 9 is a block diagram illustrating the interconnection of the computer system of FIG. 8, along with other such clients, to a server (a storage server) and storage entities.

FIG. 9 is a block diagram depicting a network architecture 900 in which client systems 910, 920 and 930, as well as a storage server 940 (e.g., administration server 400) (any of which can be implemented by computer system 810), are coupled to a network 950. Storage server 940 is further depicted as having storage devices 960(1)-(N) directly attached thereto. Storage server 940 is also connected to a SAN fabric 970. SAN fabric 970 supports access to storage devices 980(1)-(N) by storage server 940, and so by client systems 910, 920 and 930 via network 950.

With reference to computer system 810, modem 847, network interface 848 or some other method can be used to provide connectivity from computer system 810 to network 950. Client systems 910, 920 and 930 are able to access information on storage server 940 using, for example, a web browser (not shown) or, in the case of administration architecture 100, administration client 210. Such a client allows client systems 910, 920 and 930 to access administration server 400, which is hosted on storage server 940. FIG. 9 depicts the use of a network such as the Internet for exchanging data, but the present invention is not limited to the Internet or any particular network-based environment.

It will be noted that various processes according to embodiments of the present invention are discussed herein. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user using, for example, a computer system such as the storage router previously mentioned, or a similar network element, as well as a computer system such as computer system 210. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media. optical storage media such as compact disk media (e.g., CD-ROM, CD-R, etc.) and digital video disk storage media. nonvolatile memory storage memory including semiconductor-based memory units such as FLASH memory, EEPROM, EPROM, ROM or application specific integrated circuits. volatile storage media including registers, buffers or caches, main memory, RAM, and the like. and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method implemented on a computer, the method comprising:
    adapting a graphical user interface (GUI) to provide a function, wherein:
        the adapting comprises customizing the GUI using an extension, the extension is based at least in part on product-specific characteristics of a digitally controlled device,
        the extension is configured to interact with an object,
        the object represents the digitally controlled device,
        the function is configured to allow the GUI to be used to control the digitally controlled device, and
        the adapting comprises supporting the function in the GUI by providing the GUI with access to the extension; and
    managing the digitally controlled device, wherein
        the managing is performed using a processor, and
        the managing comprises interacting with the object using the extension in response to an input received via the GUI.

2. The method of claim 1, wherein the function comprises:
    accessing a relationship between the object and another object; and
    displaying information regarding the digitally controlled device.

3. The method of claim 1, wherein the digitally controlled device comprises a network attached storage device.

4. The method of claim 1, wherein the digitally controlled device comprises a storage area network (SAN) switch device.

5. The method of claim 1, wherein:
the extension implements user interface elements that are specific to the digitally controlled device, and
the GUI implements user interface elements that are generic to the digitally controlled device and to a plurality of other entities.

6. The method of claim 5, wherein:
the digitally controlled device comprises a storage control device;
the function comprises adding disks to a disk group controlled by the storage control device; and
the extension implements an input interface for enabling a user to select multiple disks that are configured to be added to the disk group.

7. The method of claim 1, further comprising:
displaying messages on the GUI based on a message catalog that allows for internationalization.

8. A system comprising:
means for adapting a graphical user interface (GUI) to provide a function, wherein:
the adapting comprises customizing the GUI using an extension, the extension is based at least in part on product-specific characteristics of a digitally controlled device,
the extension is configured to interact with an object,
the object represents the digitally controlled device,
the function is configured to allow the GUI to be used to control the digitally controlled device, and
the adapting comprises supporting the function in the GUI by providing the GUI with access to the extension; and
means for managing the digitally controlled device, comprising
means for interacting with the object using the extension in response to an input received via the GUI.

9. The system of claim 8, wherein the function comprises:
accessing a relationship between the object and another object; and
displaying information regarding the digitally controlled device.

10. The system of claim 8, wherein the digitally controlled device comprises a network attached storage device.

11. The system of claim 8, wherein the digitally controlled device comprises a storage area network (SAN) switch device.

12. The system of claim 8, wherein:
the extension implements user interface elements that are specific to the digitally controlled device, and
the GUI implements user interface elements that are generic to the digitally controlled device and to a plurality of other entities.

13. The system of claim 12, wherein:
the digitally controlled device comprises a storage control device;
the function comprises adding disks to a disk group controlled by the storage control device; and
the extension implements an input interface for enabling a user to select multiple disks that are configured to be added to the disk group.

14. The system of claim 8, further comprising:
means for displaying messages on the GUI based on a message catalog that allows for internationalization.

15. A method comprising:
adapting a graphical user interface (GUI) to provide a function, wherein:
the function enables the GUI to be used to control a digitally controlled device,
the GUI is adapted using configuring information,
the configuring information comprises information regarding
the function, and
an extension,
the function is configured to interact with the extension,
the adapting comprises customizing the GUI using the extension,
the extension is based at least in part on product-specific characteristics of the digitally controlled device,
the extension is configured to interact with an object, and
the object represents the digitally controlled device.

16. A system comprising:
one or more processors; and
a computer-readable storage medium having encoded thereon instructions executable by the one or more processors, wherein the instructions comprise instructions for adapting a graphical user interface (GUI) to provide a function, wherein:
the function is configured to allow the GUI to be used to control a digitally controlled device,
the GUI is adapted using configuring information,
the configuring information comprises information regarding
the function, and
an extension,
the function is configured to interact with the extension,
the adapting comprises customizing the GUI using the extension,
the extension is based at least in part on product-specific characteristics of the digitally controlled device,
the extension is configured to interact with an object, and
the object represents the digitally controlled device.

* * * * *